US008380700B2

(12) United States Patent
Moon et al.

(10) Patent No.: US 8,380,700 B2
(45) Date of Patent: Feb. 19, 2013

(54) AD HOC GEOSPATIAL DIRECTORY OF USERS BASED ON OPTIMIZING NON-TURING COMPLETE EXECUTABLE APPLICATION

(75) Inventors: Billy Gayle Moon, Cary, NC (US); James J. Miner, Morrisville, NC (US); Bryan Turner, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/085,686

(22) Filed: Apr. 13, 2011

(65) Prior Publication Data
US 2012/0265750 A1 Oct. 18, 2012

(51) Int. Cl.
*G06F 17/30* (2006.01)
(52) U.S. Cl. .................. 707/713; 707/715; 707/999.003
(58) Field of Classification Search .................. 707/715, 707/713
See application file for complete search history.

(56) References Cited

U.S. PATENT DOCUMENTS

| 7,299,419 B2 * | 11/2007 | Evans ........................... 715/763 |
| 2005/0076054 A1 | 4/2005 | Moon et al. |
| 2006/0179143 A1 | 8/2006 | Walker et al. |
| 2006/0188327 A1 | 8/2006 | Moon |
| 2006/0206898 A1 | 9/2006 | Miner et al. |
| 2007/0112511 A1 * | 5/2007 | Burfeind et al. .............. 701/213 |
| 2007/0124296 A1 | 5/2007 | Toebes |
| 2008/0126403 A1 | 5/2008 | Moon |
| 2009/0307189 A1 | 12/2009 | Bobbitt et al. |
| 2010/0145979 A1 * | 6/2010 | Barnett ......................... 707/769 |
| 2010/0157899 A1 * | 6/2010 | Manz et al. .................... 370/328 |
| 2010/0325608 A1 * | 12/2010 | Radigan ........................ 717/106 |
| 2011/0093803 A1 * | 4/2011 | Ohazama et al. ............. 715/764 |
| 2011/0142347 A1 * | 6/2011 | Chen et al. .................... 382/190 |
| 2011/0239186 A1 * | 9/2011 | Zinkovsky et al. ........... 717/107 |

OTHER PUBLICATIONS

Wikipedia, "Category theory", [online], Nov. 28, 2010, [retrieved on Dec. 2, 2010], Retrieved from the Internet: <URL: http://en.wikiperia.org/w/index.php?title=Category_theory&printable=yes>, pp. 1-9.
Wikipedia, "Data fusion", [online], Feb. 9, 2010, [retrieved on Mar. 9, 2010] Retrieved from the Internet: <URL: http://en.wikipedia.org/w/index.php?title=Data_fusion&printable=yes>, pp. 1-5.

(Continued)

*Primary Examiner* — Miranda Le
(74) *Attorney, Agent, or Firm* — Leon R. Turkevich

(57) ABSTRACT

In one embodiment, a method comprises receiving from a user interface, by a computing device, a request for execution of at least one lambda function in an operation of a geospatial application, the geospatial application having lambda functions for operating on one or more entities of an ad hoc geospatial directory accessible by the computing device, the lambda functions having strongly typed definitions according to a prescribed symbol manipulation language that is a non-Turing complete language, that does not permit partial functions, and that is independent of any attribute of any computing system; optimizing execution by the computing device of the operation on the ad hoc geospatial directory; and the computing device returning to the user interface a response to the request based on the optimizing execution of the operation, the response including a data structure including at least one of the lambda functions for a corresponding at least one of generating a query of the ad hoc geospatial directory, modifying a state of at least a first of the entities, or accessing the first of the entities.

17 Claims, 11 Drawing Sheets

OTHER PUBLICATIONS

Oracle Beehive Administrator's Guide, Release 1 (1.4), e13797-02, [online], Dec. 2008, [retrieved on Mar. 8, 2010], Retrieved from the Internet: <URL: http://download.oracle.com/docs/cd/E13789_01/bh.100/e13797.pdf> pp. 1-310.

Purvis et al., "A Framework for Distributed Workflow Systems", [online], [retrieved on Mar. 8, 2010], Retrieved from the Internet: <URL: http://secml.otago.ac.nz/Documents/HICSS34-mkp-ST2IM04.pdf>, pp. 1-8.

"Mapping to WebSphere MQ Workflow", [online], [retrieved on Mar. 8, 2010], Retrieved from the Internet: <URL: http://publib.boulder.ibm.com/infocenter/dmndhelp/v6rxmx/topic/com.ibm.btools.help.modeler.doc/doc/reference/mappings/fdlexportmapping.html>, pp. 1-3.

Li et al., "A Decentralized Agent Framework for Dynamic Composition and Coordination for Autonomic Applications", Proceedings of the 16th International Workshop on Database and Expert Systems Applications (DEXA '05), [online], [retrieved on Mar. 8, 2010], Retrieved from the Internet: <URL: http://ieeexplore.ieee.org/stamp/stamp.jsp?arnumber=01508265>, pp. 1-5.

"Kind, sort, and type", [online], [retrieved on Dec. 3, 2010], Retrieved from the Internet: <http://difference-between.com/english-language/kind-sort-and-type/>, pp. 1-3.

Wikipedia, "Kind, (type theory)", [online], Nov. 23, 2010, [retrieved on Dec. 2, 1010], Retrieved from the Internet: <URL: http://en.wikipedia.org/wiki/Kind_%28type_theory%29., pp. 1-3.

"A Kind System for GHC", [online], [retrieved on Dec. 3, 2010], Retrieved from the Internet: <URL: http://hackage.haskell.org/trac/ghc/wiki/KindSystem>, pp. 1-7.

Wikipedia, "Many-sorted logic", [online], Oct. 16, 2010, [retrieved on Dec. 10, 2010], Retrieved from the Internet: <URL: http://en.wikipedia.org/w/index.php?title=Many-sorted_logic&printable=yes>, 1 page.

MSDN, "How to: Deploy a Workflow Template", [online], [retrieved on Mar. 8, 2010], Retrieved from the Internet: <URL: http://msdn.microsoft.com/en-us/library/ms460303%28printer%29.aspx>, pp. 1-2.

Wikipedia, "Mobile agent", [online] Feb. 27, 2010, [retrieved on Mar. 9, 2010], Retrieved from the Internet: <URL: http://en.wikipedia.org/w/index.php?title=Mobile_agent&printable=yes>, pp. 1-3.

Nagleberg, "Building Geospatial Tools from Workflow Systems", [online], Sep. 10, 2001, [retrieved on Mar. 8, 2010], Retrieved from the Internet: <URL: http://www.cct.lsu.edu/~gallen/Students/Nagelberg_Summer2007.pdf>, pp. 1-3.

Farrell (presenter), "North Carolina Geospatial Data Archiving Project/NDIIPP: Collection and preservation of at-risk digital geospatial data", [online], Mar. 27-28, 2005, [retrieved on Mar. 8, 2010], Retrieved from the Internet: <URL: http://www.lib.ncsu.edu/ncgdap/presentations/Robs_workflow_presentation_State_Arch_mtg_Mar_2006.ppt>, pp. 1-15.

"SAP Business Workflow (BC-BMT-WFM)", [online], [retrieved on Mar. 8, 2010], Retrieved from the Internet: <URL: http://help.sap.com/saphelp_nw04/helpdata/en/35/26b144afab52b9e10000009b38f974/content.htm>, 1 page.

Wikipedia, "Semantics", [online], Apr. 19, 2010, [retrieved on Apr. 19, 2010], Retrieved from the Internet: <URL: http://en.wikipedia.org/wiki/Semantics>, pp. 1-7.

"Socialight", [online], [retrieved on Mar. 8, 2010], Retrieved from the Internet: <URL: http://socialight.com/>, pp. 1-2.

Wikipedia, "Strong typing", [online], Jan. 7, 2011, [retrieved on Jan. 15, 2011], Retrieved from the Internet: <URL: http://en.wikipedia.org/w/indwx.php?title=Strong_typing&printable=yes., pp. 1-3.

BEA WebLogic Integration, "Using the WebLogic Integration Studio", Rel. 7.0, [online] Jun. 2002, [retrieved on Mar. 8, 2010], Retrieved from the Internet: <URL: http://web.archive.org/web/20040731143205/edocs.bea.com/wli/docs70/pdf/studio.pdf>, 426 pages.

Rees et al., "The T Manual Fifth Edition—Pre-Beta Draft", [online] Oct. 28, 1988, [retrieved on Jan. 18, 2011], Retrieved from the Internet: <URL: http://repository.readscheme.org/ftp/papers/t_manual.pdf>, (1) cover page, pp. 1-177.

Wikipedia, "Turing completeness", [online], Apr. 17, 2010, [retrieved on Apr. 19, 2010], Retrieved from the Internet: <URL: http://en.wikipedia.org/w/index.php?title=Turing_completeness&printable=yes>, pp. 1-6.

Wikipedia, "Turing machine", [online], Apr. 28, 2010, [retrieved on Apr. 30, 2010], Retrieved from the Internet: <URL: http://en.wikipedia.org/w/index.php?title=Turing_machine&printable=yes>, pp. 1-19.

Wikipedia, "Type theory", [online], Nov. 24, 2010, [retrieved on Dec. 2, 2010], Retrieved from the Internet: <URL: http://en.wikipedia.org/w/index.php?title=Type_theory&printable=yes>, pp. 1-9.

"Processing geospatial vertical data", [online], [retrieved on Mar. 8, 2010], Retrieved from the Internet: <URL: http://virtualexplorer.com.au/article/2008/194/geospatial-data-using-google-earth/vertical.html>, pp. 1-5.

\* cited by examiner

SML Language, 16

-Total Functional Language and Does Not Permit Partial Functions

-Independent of any Hardware or Software-Specific Requirements of Any Computing System -Non-Turing Complete: All Functions Must Return a Result -Metalanguage for Describing Semantics of Functions in an Application: Application Written as Logical Specification -Application Functions Described Using at Least the Following Logical Types: Tuple, Sum, and/or Lambda Type

Figure 4

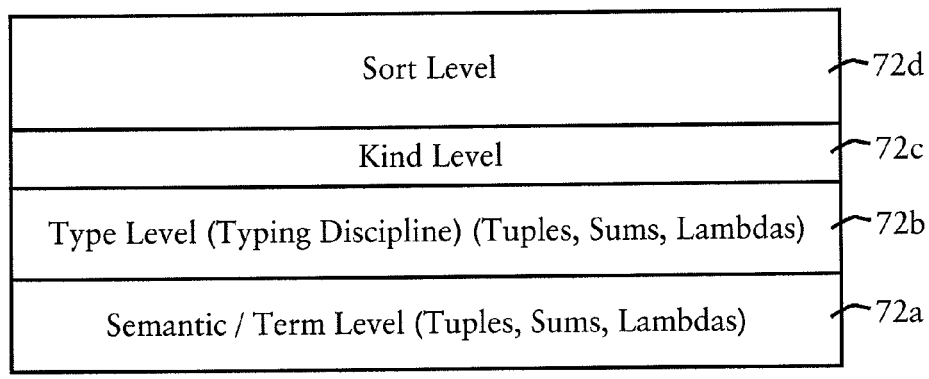

Figure 5

AD HOC GEOSPATIAL DIRECTORY OF USERS BASED ON OPTIMIZING NON-TURING COMPLETE EXECUTABLE APPLICATION

TECHNICAL FIELD

The present disclosure generally relates to the writing, compiling, and execution of executable applications or programs on different computing systems having prescribed hardware and/or software specific requirements. More particularly, the present disclosure relates to geospatial applications or programs that are written for generation of a directory of users in a distributed computing environment.

BACKGROUND

This section describes approaches that could be employed, but does not necessarily describe approaches that previously have been conceived or employed. Hence, unless explicitly specified otherwise, any approaches described in this section are not prior art to the claims in this application, and any approaches described in this section are not admitted to be prior art by inclusion in this section.

Processor-based applications or programs to date have been written in accordance with constraints imposed by hardware-specific and/or software-specific constraints of the underlying computing system intended to execute the applications or programs. For example, assembly language instruction sets are designed for a specific processor circuit for manipulation of digital bits (i.e., having a value of either 0 or 1) that can be interpreted by the specific processor circuit either as an executable instruction, an address value for a register or memory location accessible by the specific processor circuit, or data: applications written using the assembly instruction sets must strictly follow the associated software and/or hardware based requirements of the assembly language instruction sets (e.g., syntax, etc.). Operating systems (e.g., Microsoft Windows XP®, Unix, Linux, etc.) provide a level of abstraction that enables application developers to ignore at least some of the hardware or software-based constraints of the specific processor circuit; however, such operating systems in return impose their own hardware and/or software based constraints that must be followed by an application executed using such operating systems to perform a prescribed function.

Consequently, substantial compatibility problems continue to exist when an attempt is made to employ an existing application (developed for a first computing system) on a second computing system that is not perfectly compatible with the first computing systems. Moreover, more complex computing systems are constantly being developed (e.g., newer processor circuits offering multithreading; parallel computing or blade computing; network-based distributed computing; cloud computing, etc.). Hence, application developers continue to confront the difficult requirement of understanding the features and requirements of the more complex computing system in order to modify existing applications for compatibility or develop a new application that operates without failure in the more complex computing system. The difficulty increases dramatically with the concurrent requirement in geospatial applications of responding to ad hoc events for ad hoc collaboration.

BRIEF DESCRIPTION OF THE DRAWINGS

Reference is made to the attached drawings, wherein elements having the same reference numeral designations represent like elements throughout and wherein:

FIG. 4 illustrates example attributes of the symbol manipulation language 16, according to an example embodiment.

FIG. 5 illustrates a typing hierarchy used to establish strongly typed definitions for elements of an example geospatial application, according to an example embodiment.

DESCRIPTION OF EXAMPLE EMBODIMENTS

Overview

Figure 1:
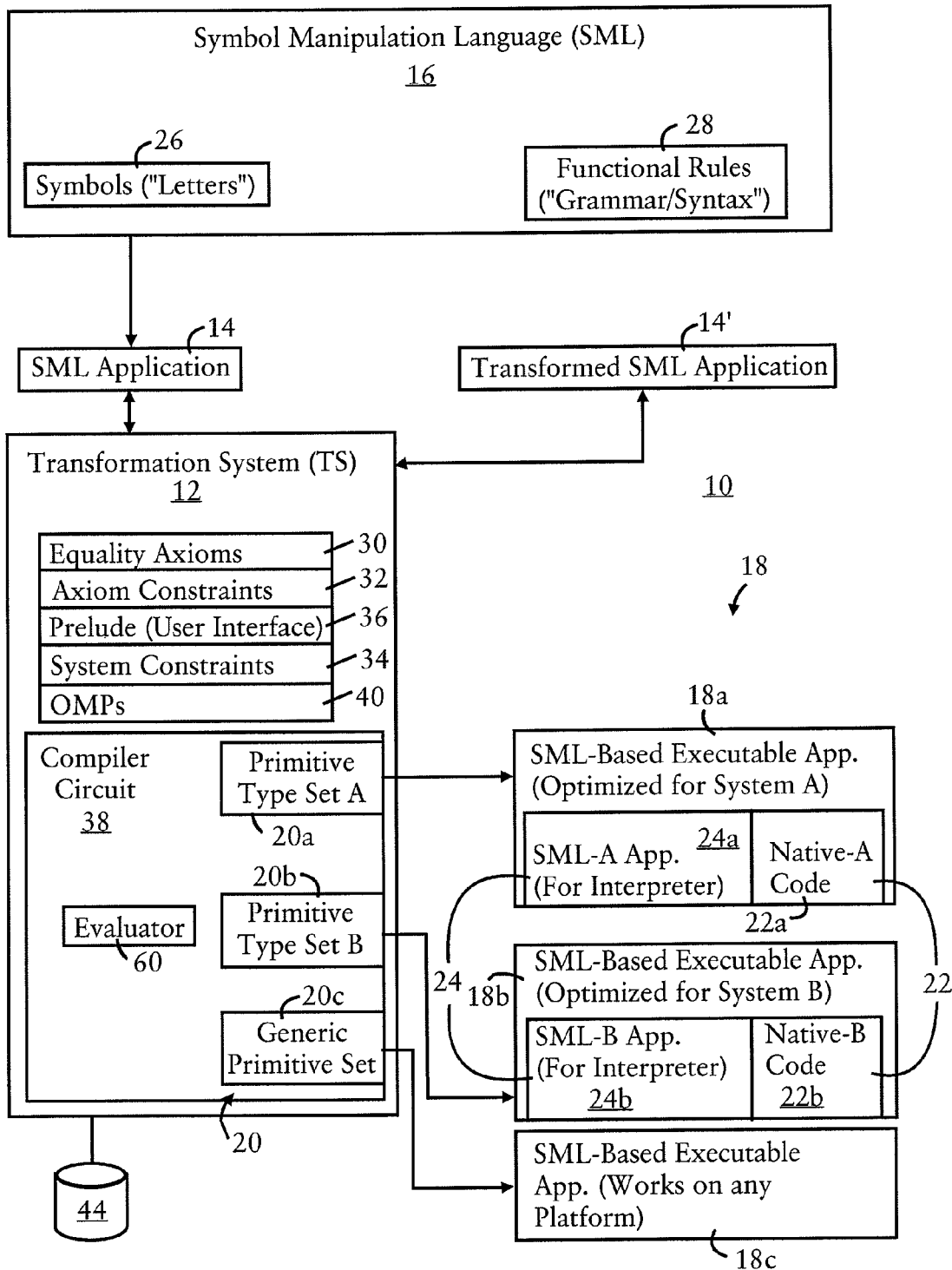
FIG. 1 illustrates an example system having an apparatus for executing optimization of an executable application written according to a prescribed symbol manipulation language (SML), according to an example embodiment.

In one embodiment, a method comprises receiving from a user interface, by a computing device, a request for execution of at least one lambda function in an operation of a geospatial application, the geospatial application having lambda functions for operating on one or more entities of an ad hoc geospatial directory accessible by the computing device, the lambda functions having strongly typed definitions according to a prescribed symbol manipulation language that is a non-Turing complete language, that does not permit partial functions, and that is independent of any attribute of any computing system; optimizing execution by the computing device of the operation on the ad hoc geospatial directory; and the computing device returning to the user interface a response to the request based on the optimizing execution of the operation, the response including a data structure including at least one of the lambda functions for a corresponding at least one of generating a query of the ad hoc geospatial directory, modifying a state of at least a first of the entities, or accessing the first of the entities.

In another embodiment, an apparatus comprises an interface circuit configured for receiving, from a user interface, a request for execution of at least one lambda function in an operation of a geospatial application, the geospatial application having lambda functions for operating on one or more entities of an ad hoc geospatial directory accessible by the computing device, the lambda functions having strongly typed definitions according to a prescribed symbol manipulation language that is a non-Turing complete language, that does not permit partial functions, and that is independent of any attribute of any computing system; and an execution circuit configured for optimizing execution by the apparatus of the operation on the ad hoc geospatial directory, the execution circuit configured for returning to the user interface, via the interface circuit a response to the request based on the optimizing execution of the operation, the response including a data structure including at least one of the lambda functions for a corresponding at least one of generating a query of the ad hoc geospatial directory, modifying a state of at least a first of the entities, or accessing the first of the entities.

DETAILED DESCRIPTION

Outline of Detailed Description
I. Introduction
  A. Overview
  B. The Symbol Manipulation Language
  C. A Distributed Services Engine
    1. Evaluator
    2. Native Compilation
II. Geospatial Language Stack Having Segregated Language Primitives
III. Example SML Application: GeoSpatial Application
IV. Example Hardware Overview
V. Optimization of Geospatial Application for Ad Hoc Geospatial Directory
I. Introduction Particular embodiments enable executable applications to be written in a manner that is completely independent of any attribute of any computing system, i.e., independent of any computing system deployment model. In particular, the executable applications are written according to a prescribed symbol manipulation language (SML). Consequently, the particular embodiments provide an ad hoc geospatial directory of users in a distributed and decentralized system, based on optimizing an SML-based geospatial application. A description will first be provided of the symbol manipulation language, and optimization and execution thereof, followed by a description of a geospatial application written according to the prescribed symbol manipulation language for generation of an ad hoc geospatial directory of users in a distributed and decentralized computing system.

The term "application" or "program" is defined as executable information stored on at least one non-transitory tangible medium and that can be configured for execution on one or more hardware-based processor circuits: the executable information can be stored as a single container (e.g., an executable file) on at least a single non-transitory tangible medium, described below; the executable information also can be stored as multiple components (e.g., fragments) on one or more non-transitory tangible media, where execution of the components by the same or distinct processor circuits can result in execution of the application (e.g., distributed computing). Unless specified otherwise, the execution of components by distinct processor circuits need not necessarily be concurrent, rather the components could be executed as distinct and independent events.

Deployment of any computing system requires establishing software or hardware specific requirements on the computing system. Hence, a "computing system deployment model" is defined herein as any computing system having at least one or more software or hardware specific requirements for deployment (i.e., physical and tangible execution) of the computing system. At least one software and/or hardware specific requirement of any computing system can be used to establish a "computing system deployment model". Hence, a computing system deployment model "A" will have at least one hardware or software specific requirement that distinguishes the computing system deployment model "A" from another computing system deployment model "B".

I.A. Overview

FIG. 1 is a diagram illustrating a system 10 having a transformation system 12 for execution of an SML application 14 according to a prescribed SML language 16, according to an example embodiment. The system 10 includes a transformation system 12 that is executed by at least one processor-based computing device (e.g., computing node 70 of FIG. 3) and configured for executing an optimization of an application 14 written according to a prescribed symbol manipulation language (SML) 16. The SML application 14 can be supplied to the transformation system 12 by a processor-based computing device (e.g., a client device such as a portable computer, web-enabled cellphone, etc.) that is distinct from the computing device (e.g., 70 of FIG. 3) executing the transformation system, for example via a network-based link (Ethernet link, Internet Protocol connection, etc.); alternately the client device and the transformation system 12 can be implemented within a single processor-based device.

Existing programming languages assume hardware-specific or software-specific parameters (i.e., requirements, constraints, etc.) for a particular computing system deployment model. Example hardware-specific requirements that have been assumed by existing programming languages for a particular computing system deployment model can include the type of microprocessor used (e.g., 32-bit or 64-bit, single core, dual core or multiple core, etc.), the manufacturer of the microprocessor (e.g., Intel processor vs. ARM processor or Motorola processor), whether the application is executed in a stand-alone computer, or in a network according to a prescribed computation model (e.g., client/server, peer to peer, distributed computing, etc.). Example software specific requirements that have been assumed by existing programming languages for a particular computing system deployment model can include the type of operating system in use (e.g., UNIX, Windows, etc.) or a given version of the operating system in use by the computing system deployment model.

The prescribed symbol manipulation language (SML) 16 is distinctly different from existing programming languages, in that the prescribed symbol manipulation language is a purely functional language that enables an executable application 14 to be expressed as a logical specification that describes functions to be executed by any computing system, independent of any hardware specific or software specific requirements of any computing system. In other words, the executable application 14 can be expressed as a manipulation of symbols consisting only of the symbol manipulation language 16 elements, described below, in a manner that is independent of any computing system deployment model. Consequently, any application 14 written in the prescribed symbol manipulation language 16 can have absolutely no relationship to any attribute of any computing system deployment model. Hence, any application 14 written in the prescribed symbol manipulation language 16 is completely independent of any software and/or hardware specific requirements of any computing system.

The transformation system 12 can provide a "mapping" between the application 14 and a particular computing system deployment model, for example certain hardware-based computing systems. The transformation system 12 can provide this "mapping" based on executing a fully nondestructive logical transformation of the application 14 into a transformed application 14' that is semantically equivalent to the application 14. This fully nondestructive logical transformation enables an unlimited number of logical transformations, as required, between the original application 14 and multiple variations (e.g., 14', 18) of the original applications, where any one variation of the original application (i.e., program variant) can be an optimization for a prescribed computing system based on axioms and constraints that can be associated with a given computing system.

Figure 3:
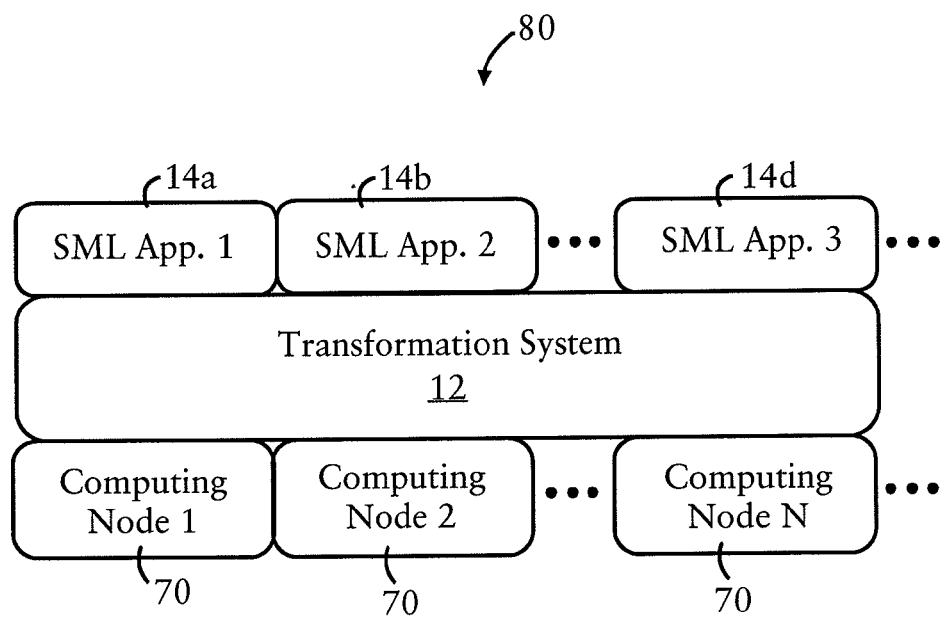
FIG. 3 illustrates execution of multiple SML applications by a distributed computing system having multiple computing nodes based on optimization by the transformation system of FIG. 1, according to an example embodiment.

The transformation system 12 can be configured for implementing a fully nondestructive logical transformation in the form of an optimization of the original SML-based application 14 and/or the transformed SML-based application 14' into an executable application 18 (e.g., 18a and/or 18b) based on prescribed hardware and/or software-specific requirements 20 (e.g., 20a and/or 20b) of a prescribed computing system deployment model (e.g., a distributed computing system 80 containing two or more computing nodes 70 as in FIG. 3). The executable application 18 generated by the transformation system 12 can include hardware and/or software-specific executable code 22 (e.g., 22a, 22b) optimized for the prescribed computing system deployment model. The executable application 18 also can include SML program elements 24 (e.g., 24a and/or 24b) that describe respective application function operations independent of any hardware or software-specific requirements of any computing system deployment model, and that are implemented by an SML program interpreter executed by the prescribed computing system deployment model.

I.B The Symbol Manipulation Language

FIG. 4 illustrates example attributes of the symbol manipulation language 16, according to an example embodiment. The symbol manipulation language 16 provides a logical specification for describing functions to be executed in a computing system deployment model, independent of any hardware-specific or software-specific requirements of any computing system deployment model. The symbol manipulation language 16 is a non-Turing complete language. Formally, the symbol manipulation language is a total functional language and does not permit partial functions. Unlike Turing-complete languages, all functions described in the symbol manipulation language 16 must return a result, i.e., no function described by the symbol manipulation language 16 is permitted to be executed without generating a result. Hence, Turing-complete functions that are capable of not generating a result (e.g., functions such as creation of an infinite loop, a branch to another location and that does not return, or a "do-while" that loops indefinitely) are considered "bottom" and are not permitted in the symbol manipulation language 16. A halt operation, required in Turing complete languages, also is not permitted in the symbol manipulation language 16.

In addition to the SML language 16 being a non-Turing complete and purely functional language, the SML language 16 also should be a higher-order language; the language 16 must be a strong and statically typed language: a language is "statically" typed only if all expressions have their types determined prior to execution of the application (e.g., determined during compilation); a language has a "strong typing" (i.e., strongly typed definitions) if the language does not permit one type to be treated as another type (e.g., treating an integer type as a string type). The symbol manipulation language 16 also must support "symbols" 26: a symbol 26 is a unique element (e.g., as in the Scheme programming language) that can be stored in one or more physical and tangible data structures (e.g., stored within at least one non-transitory storage medium 44) and that can be compared with another symbol. The symbol manipulation language 16 also must support the following operations by providing the appropriate syntactic rules 28: Pair and Projection operations (for constructing and destructing tuples, described below); Tagged-Union and Case operations (for constructing and destructing union structures); Curry and Apply operations (for constructing and destructing new functions); Identity and Composition operations (for building complex operations from simpler ones).

The symbol manipulation language 16 also can provide support for Monads, Functors, Inductive and CoInductive types, Catamorphisms, and Anamorphisms. Example programming languages that can be used to implement the disclosed symbol manipulation language 16 can include Charity, Joy, and subsets of Standard ML, Scheme, and Haskell. In one embodiment, the symbol manipulation language 16 can be implemented using a subset of Haskell.

The symbol manipulation language 16 provides a logical specification for describing functions to be executed in a computing system, in that the symbol manipulation language serves as a metalanguage for functions based on describing the semantics (i.e., the meanings) of the functions. In particular, a function is a transformation of one and only one input to one and only one output: as described below, an "input" and/or an "output" may be composed of multiple symbols 26, for example a "pair" as an input (e.g., a & b->c) or a "pair" as an output (e.g., a->(b & c)). The symbol manipulation language provides a logical specification for the description of the function, without describing the input or the output. In particular, the functional relationship between inputs and outputs can be described in terms of logical "types", according to foundational mathematics, universal algebra and category theory: example logical types include at least a tuple, a sum, and a lambda type.

As described in further detail below, a given symbol 26 can be used to represent a particular value independent of form. In other words, a symbol 26 in one example represents a particular value that can be implemented as any one of an integer, string (alphanumeric), Boolean value (e.g., a bitmask), floating point, etc., without explicitly identifying the symbol as any one of the integer, string, Boolean value, floating point, etc. Note, however, that a symbol 26 is not a variable, because the value of a symbol 26 does not change: a symbol 26 is only ever one value, while a variable is some class of values, of which the variable currently is assigned one value at a time. Hence, a reference to an alphanumeric letter in this specification in quotes (e.g., "a") refers to a symbol 26, and not a variable, unless explicitly identified otherwise as a "variable".

Hence, the symbols "a" and "b" 26 in an expression can be used to express the relationship between "a" and "b", without identifying whether any one of the symbols is implemented as an integer, string, Boolean value, floating point, etc.

A tuple is a pairing (or association) between one symbol "a" and another symbol "b", for example enabling description of a function that maps from the inputs "a and b" (i.e., (a & b)) to an output: the inputs "a" and "b" can be of the same type (e.g., "a" is an integer and "b" is an integer) or different types (e.g., "a" is an integer and "b" is a floating point). A sum (i.e., coproduct) identifies a relationship between one symbol "a" and another symbol "b", for example enabling description of a function that maps an input "a or b" (i.e., a|b) to an output, where the inputs "a" and "b" can be either the same or different types; a sum also can be used to describe a conditional operation (e.g., "if . . . then").

A lambda type (λ) changes an existing function into a new function. The existing function (serving as an input to the lambda type) takes one pair as input and returns one output (a & b->c). The new function (output by the lambda type) takes one value as input, and returns a new function as output (a->(b->c)). The use of lambda types is the foundation for typed lambda calculus (excluding untyped lambda calculus).

These example logical types (tuples, sums and lambda types) can be used to derive additional functions or operations that combine symbols, for example products, exponentials, etc.

Hence, the symbol manipulation language 16 provides a logical and semantic specification for describing functions independent of any hardware-specific or software-specific requirements of any computing system, based on the tuple, sum, and lambda types that define the relationships between the symbols 26 that are manipulated by the functions. Category theory provides that repeating patterns can be described in a manner that is mathematically provable: the symbol manipulation language 16 is established based on defining a base category of symbols 26, and adding to the base category tuples, sums, and lambda types and other (optional) logical types that describe the functions to be performed.

By way of analogy, consider the construction of a building structure, for example a commercial office building or a home: the application written according to the prescribed symbol manipulation language is analogous to an architect's blueprint plan that can illustrate (graphically and with textual annotations) the structure of the building based on including plan views (e.g., floor plan views), elevation views, and/or cross-sectional views, without any details as to the specific construction techniques for implementing the blueprint plan. In other words, the same blueprint plan can be used to build the same building structure using different construction techniques, depending on the time the building structure is built or the particular building codes in effect at the building site.

Consequently, an application written according to a prescribed symbol manipulation language 16 as described herein is independent of any hardware and/or software-specific requirements of a prescribed computing system deployment model such as: explicit memory allocation, persistent storage, serial ordering constraints, messaging, threading, shared state, hardware access, operating system interaction, or real-time clocks. The symbol manipulation language 16 also is isolated from any and all interactions with any hardware or software attributes of the computing system deployment model, and isolated from any notion of the forward progression of time (e.g., as in runtime execution of an executable resource by the computing system).

In addition, since the symbol manipulation language 16 is based on category theory (which can provide mathematically-provable descriptions of repeating patterns), absolute backwards compatibility is guaranteed between a first application and a newer application. In particular, assume the first application is written in a first symbol manipulation language having an initial set of logical types. Assume further the newer application is written in a later symbol manipulation language having an expanded set of logical types that includes the initial set of logical types and newly added logical types having been discovered according to category theory. Category theory ensures that the first application written in the first symbol manipulation language is compatible with the newer application written in the later symbol manipulation language because the first symbol manipulation language is mathematically consistent with the later symbol manipulation language.

The application 14 written according to the prescribed symbol manipulation language 16 can be executed on any computing system deployment model based on execution of the application 14 by an interpreter that is native to the corresponding computing system deployment model (i.e., the interpreter is specific to the hardware and/or software requirements of the corresponding computing system deployment model).

Figure 2:
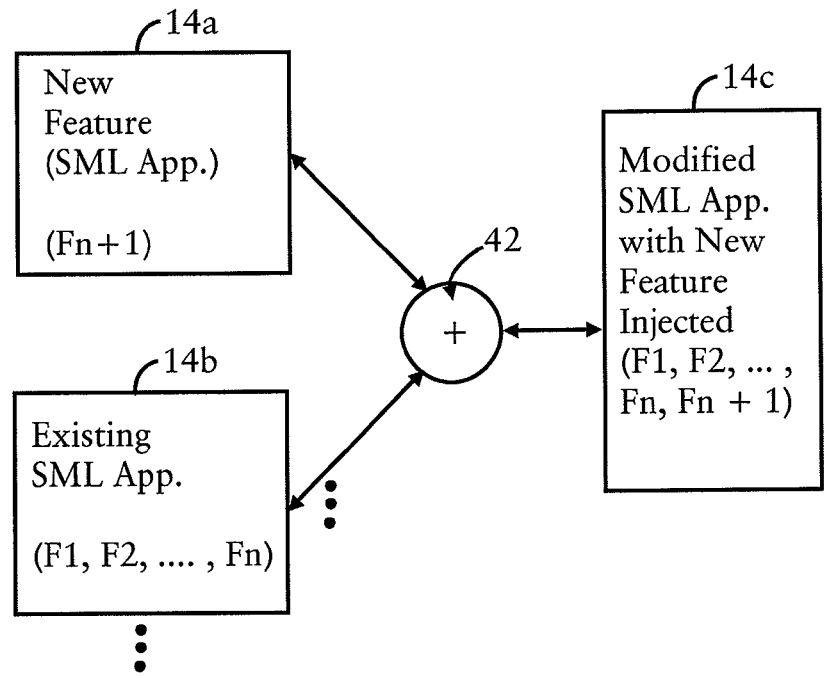
FIG. 2 illustrates an example combining example SML applications into a modified SML application, and splitting the modified SML application into multiple SML application components, according to an example embodiment.

As illustrated in FIG. 2 and described in further detail below, new features can be injected based on the transformation system 12 injecting a new application 14a containing the new feature (e.g., feature "Fn+1") into an existing application 14b having existing features "e.g., "F1, F2, . . . , Fn"), and executing the super-optimization 42 for generation of the modified application 14c containing the existing features and the new feature (e.g., "F1, F2, . . . , Fn, Fn+1").

As described in further detailed below, each original version of an SML application 14 can be retained (e.g., in the storage 44); hence, the original version of an SML application 14 can be recompiled into new variants at any time, for example as new equality axioms 30, new primitive type sets 20, and/or new program fragments (e.g., 14a of FIG. 2) become available. Since the combination of the SML application 14a with the SML application 14b is semantically equivalent to the modified application 14c, and since the original versions of the SML applications 14a and 14b also can be retained by the transformation system 12, the transformation system 12 also can effectively split the modified application 14c into the original application components 14a and 14b, or any variation thereof (including tens, hundreds, thousands, etc. of application components 14 and/or replicas thereof) as desired depending on the preferred optimization for a given computing system deployment model (e.g., client/server computing, peer to peer computing, distributed computing, cloud computing, etc.).

The injecting, splitting, and/or replicating of an application 14 by the compilation and execution infrastructure of the transformation system 12 enables the transformation system 12 to build a distributed transaction processor (similar to a relational database system), and enables the transformation system 12 to provide a series of efficiency improvements based on relevant optimization operations.

I.C. A Distributed Services Engine

The compiler circuit 38 can be implemented based on batch-processing a single source SML application 14 into a single executable application 18. The compiler circuit 38 also can be implemented as a complete distributed services engine based on the compiler circuit 38 including an evaluator circuit 60, illustrated in FIG. 1.

The compiler circuit 38 and the evaluator circuit 60 in combination can immediately compile and evaluate incoming program fragments (e.g., 14 of FIG. 1 and/or 14a of FIG. 2). Results from the immediate compiling and evaluating of the incoming program fragments (e.g., 14 and/or 14a) can be returned to a submitting client device either as a transformed application (e.g., 14' of FIG. 1) or as part of a modified application (e.g., 14c of FIG. 2) based on the incoming program fragment (14a of FIG. 2) and another existing SML application (14b of FIG. 2). Since results can contain functions as well as values, the transformation system 12 can implement behaviors needed for distributed services.

I.F.1. Evaluator

The evaluator circuit 60 can implement a runtime infrastructure required to execute an SML application 14 compiled according to the symbol manipulation language 16 and associated constraints 32, 34, and is analogous to a C runtime library, or a Java Virtual Machine. The evaluator circuit 60 for the SML 16 is configured for providing a non-destructive association with the hardware-specific and/or software-specific attributes of the computing system deployment model that are required for execution of the SML application 16, example attributes including: memory management, persistence, networking, etc.

The evaluator circuit 60 can be implemented using any programming language (including SML 16). The evaluator circuit 60 also can be supplied a program (e.g., SML application 14) in a form of byte code, or statically linked with the program (e.g., 14) as a native library that is loaded and executed by the compiler circuit 38 during the compilation process. Executable programs used to implement the evaluator circuit 60 can be general such that they work on any hardware or software platform, or specially designed and implemented (e.g., as a hardware-based logic circuit such as an application specific integrated circuit (FPGA)) for a particular platform or purpose.

At a minimum, any executable application 14 for a given computing system deployment model that is used to implement the evaluator circuit 60 must provide a primitive set 20 that establishes a nondestructive equivalence between native versions (i.e., hardware and/or software specific expressions) of each primitive in the SML language 16, enabling all programs 14 to work with all evaluator circuits 60. Beyond this minimum, an evaluator circuit 60 can expose additional primitives, such as threading, vector processing, persistent storage, databases, networking, or other platform-specific features, described below in further detail in Section II. These features can be used when associated equality axioms 30 and metrics 40 are provided to the compiler circuit 38.

Thus, an SML application 14 compiled for an evaluator circuit 60 with persistence can cause the evaluator circuit 60 to store or retrieve data from a storage medium 44 during the computation of its results. The same SML application 14 compiled for an evaluator circuit 60 with networking could operate as a distributed computation.

I.F.2. Native Compilation

As described previously, the compiler circuit 38 can be configured for generating native code 22 for any platform, given the appropriate axioms 30 and metrics 40. The disclosed compiler circuit 38 has been demonstrated in experimental testing to compete favorably against expert human optimizations (i.e., manual optimizations), and to balance factors that are often overlooked (power efficiency, code size vs. execution speed, RF interference modeling, etc).

II. Geospatial Language Stack Having Segregated Language Primitives

Figure 6:
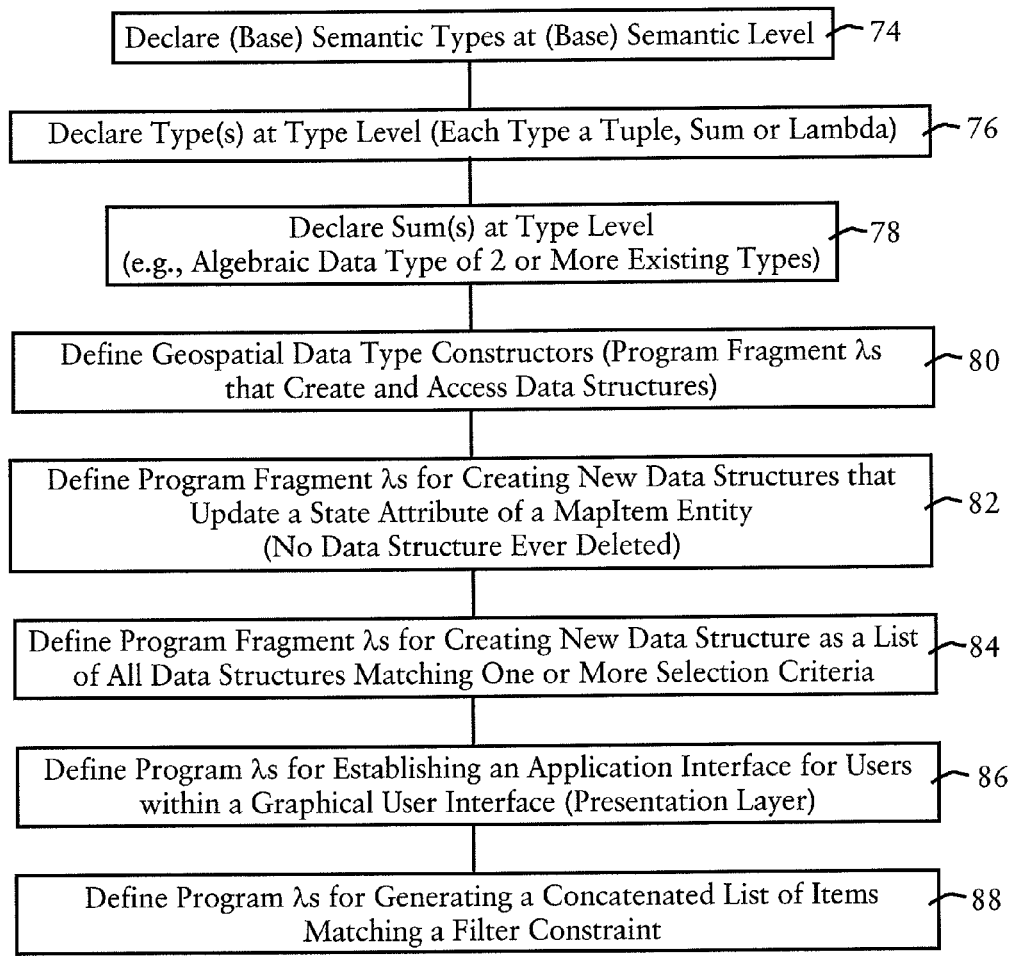
FIG. 6 illustrates establishment of the strongly typed definitions for the elements of an example geospatial application, according to an example embodiment.

FIGS. 5 and 6 illustrate a typing hierarchy used to establish strongly typed definitions for elements (e.g., data structures, lambda functions) of a geospatial application, according to an example embodiment. As described in further detail with respect to Table 1, all elements of the SML-based geospatial application 14 are strongly typed: as described previously, a language has a "strong typing" (i.e., strongly typed definitions) if it does not permit one type to be treated as another type (e.g., treating an integer type as a string type). Hence, all elements of the geospatial application (including data elements, tuples, sums, and lambda functions) are precisely defined according to type theory. The use of multiple layers as illustrated in FIGS. 5 and 6 enables an application of strict and precise definitions to entities defined using structural type construction (e.g., combinations of existing types) and that provide a layer of abstraction that maintains compliance with the strict definitions at the type level.

For example, FIG. 5 illustrates a base semantic/term level 72a for defining semantics for basic terms of the geospatial application 14, including individual terms, tuples, sums, and lambdas. A "Term" is a sequence of syntactic elements (e.g., characters, glyphs) with no interpretation. "Terms" are sequences of characters and/or glyphs (i.e., non-verbal symbols conveying information) composed of prescribed allowable language syntax (e.g., letters, spaces, parenthesis, comma, digits, etc.). Example definitions at the semantic level 72a in the geospatial application 14 illustrated in Table 1 below include "String" and "Integer". For example, the term level may have the character sequences (shown in quotes) "Foo", "(b,c)" "(\a->a+)", each of which are only sequences of characters (and/or glyphs) that must satisfy a Term definition, for example the definition of a String (e.g., "Foo"), Integer, Tuple (e.g., "(b,c)") or Lambda (e.g., "(\a->a+1)"). Hence, no term can exist in the geospatial application 14 unless it is either explicitly defined at the semantic/term level 72a, or derived based on structural type construction using a combination of other terms explicitly defined at the semantic/term level 72a. In some cases, characters may satisfy multiple sets of constraints: for example, the sequence "10" could be interpreted as an integer, a floating point decimal value, or a two-bit sequence. Hence, typing discipline is implemented using strongly typed definitions that enforce one and only one meaning to the sequence of characters, thereby eliminating unintended meanings.

The type level 72b specifies precisely defined Types. A Type is a set of constraints on Terms to define some domain-specific meaning. In other words, a type is defined by one and only one precisely defined meaning. For example, a Type defined as "Integer" recognizes a contiguous sequence of digits without decimal points as a decimal (base Ten) value. Hence, a Term is of some Type if and only if the Term satisfies the constraints of the Type. Types are distinct from syntax, as types in general cannot be defined by the structure of the syntax. Example types defined in the geospatial application of Table 1 include "Name", "Email", "Phone", "IpAddr", etc. A type may contain a variable, in which the type can be fully determined as belonging to a predefined type (a "concrete type") once the variable is filled with a value.

Structural type construction enables types to be defined as combinations of existing types; in contrast, a monomorphic type is a type that is defined by one and only one type. In this specification, the terms "sum" and "coproduct" are equivalent and interchangable. A sum can be a type that is defined as a structural composition at the type level 72b that is derived from other types in the type level 72b: sums also are referred to as "Algebraic Data Types". Algebraic data types are a hierarchical combination of coproducts (i.e., sums) and products. Algebraic data types can be illustrated in the form of a tree, where a given coproduct forms the root of the tree. For example, the root coproduct "Item" 90h can branch to any one of the products of type Person 90a, Media 90b, RFid 90c, Inline 90d, Video 90g, or Name 90j. Each node that branches from the coproduct "Item" 90h in turn also can be defined as a coproduct containing one or more products. For example, the coproduct "Person" 90a (within the subtree rooted by the root coproduct "Item" 90a) can be defined as containing the products "Name" 90j, "Email", "Phone", and "IpAddr", each of which has a strongly typed semantic definition as a string.

Hence, the strongly typed definitions of tuples, sums, and/or lambda functions guarantee that each of the tuples, sums, and lambda functions so defined can be represented in the form of a tree: if any tuple, sum, or lambda function (TSM) cannot be represented in the form of a tree structure, the TSM is deemed not to have a strongly typed definition.

Hence, a type (e.g., "Person" in Table 1) can be defined as a structural composition of existing types, a form of abstraction independent from the type hierarchy. Note, however, that a type defined as a structural composition of existing types is distinct and not synonymous with its structural counterparts; hence a Name-type could be defined to be a string, however a String cannot be passed where a Name is required, except for unique Name-type constructor.

The kind level 72c provides definitions for "Kinds". A "Kind" is a set of constraints on "Types". For example, all term-level types are of the unique Kind "*", while the advanced Kind "*->*" is a function that takes one type and return a new type (e.g., generating a list). For example, a list is a Kind which takes any type "X" and returns a new type which is a "list of X". The Kind "*->*" is not a Type. A Type cannot have Kind "*->*", it must have kind "*". Hence, if the list-generating Kind "*->* is applied to a Type (e.g., Integer), the result is a Type "list of Integer", and since it is a Type, its Kind is "*". A Kind is sometimes referred to as a "type of types", however since types cannot process themselves a function from some type to some type "*->*" cannot be a Type, it must be a Kind.

A sort defined at the sort level 72d is a "type of Kinds". A Kind that contains a variable requires a sort over the Kinds. Sorts can contain a single concrete object (typically represented with a box symbol "□"), and the function type over kinds ("□->□").

The use of the typing hierarchy of FIG. 5 enables strongly typed definitions to be established for elements of a geospatial application 14, while maintaining flexibility for newly added elements to the geospatial application 14. In particular, new elements can be added by creating a new type, and semantically combining the new type with another existing type to form a new sum (i.e., coproduct): creating a new type is preferable to redefining the existing type, as any attempt to redefine any existing element can have substantial ramifications if a new definition were to be applied to an existing type in an existing SML application. Hence, the typing hierarchy of FIG. 5 provides flexibility for new types while ensuring semantic compliance with existing types.

FIG. 6 illustrates implementing strongly typed definitions for elements (e.g., data structures, lambda functions) in a geospatial application, according to an example embodiment. The steps of FIG. 6 are illustrated with respect to the example geospatial application 14 specified in Table 1.

III. Example SML Application: GeoSpatial Application

Table 1 illustrates an example application 14, written according to the SML language 16 and implemented using the T programming language, that describes an example geospatial application 14 that includes an execution layer and a user interface 36 of FIG. 1. As described previously, the transformation system 12 can be configured for transforming the SML-based geospatial application in Table 1 into an SML-based executable application that can be optimized for a prescribed computing system deployment model.

Table 1 illustrates that the geospatial application 14 specifies strongly typed definitions (i.e., strongly typed declarations) for all data structures and functions, including declarations of primitives (e.g., categorical primitives, primitive functions). For example, the categorical primitive "fst" returns the first item in a tuple, and the categorical primitive "snd" returns the second item in a tuple; the combinators primitive "const" returns a constant, the combinators primitive "id" is an identity function, etc. Table 1 also illustrates manipulation of tuples, sums, and lambdas using curry and uncurry operations according to lambda calculus. A curry operation can deconstruct a function having multiple inputs into an equivalent function that accepts only a single input, and as output the equivalent function returns another function that accepts only a single input, etc.

A detailed description of the geospatial application in Table 1 follows immediately after the listing of the geospatial application.

TABLE 1

Example Program Listing for GeoSpatial Application

```
-------------------------------
-- Geo-Spatial Collaboration --
-------------------------------
-- Written in 'T' language for
-- a model-driven distributed-
-- computing architecture.
-------------------------------

---------------
-- Data Types
--
-- Assign unique types to some commonly used data.
data Name       = Name      String;
data Email      = Email     String;
data Phone      = Phone     String;
data IpAddr     = IpAddr    String;
data Url        = Url       String;
data Mime       = Mime      String;
data MacAddr    = MacAddr   String;
data PosX       = PosX      Integer;
data PosY       = PosY      Integer;
data PosZ       = PosZ      Integer;
data Width      = Width     Integer;
data Height     = Height    Integer;
data Person     = Person    (Name, Email, Phone, IpAddr);
data Media      = Media     (Name, Mime, Url);
data Rfid       = Rfid      (MacAddr, Name, String, String);
data Location   = Location  (PosX, PosY, PosZ);
data Scale      = Scale     (Width, Height);
data Inline     = Inline    (Media, Scale);
```

TABLE 1-continued

Example Program Listing for GeoSpatial Application

```
data Video      = Video     (Name, String, IpAddr);
---------------------
-- Application Types
--
data Item       = PersonItem    Person
                | MediaItem     Media
                | RfidItem      Rfid
                | InlineItem    Inline
                | VideoItem     Video
                | StringItem    Name;
data MapItem = MapItem (Item, Location);
data MapItemEntity  = MapItemEntity (Integer, MapItem
                    , (PosX -> PosY -> Void)    -- MoveTo
                    , (PosX -> PosY -> Void)    -- Offset
                    , (Name -> Void)            -- Rename
                    , (PosZ -> Void)            -- SetZ
                    );
data PersonMiEntity = PersonMiEntity (Integer, MapItem
                    , (PosX -> PosY -> Void)    -- MoveTo
                    , (PosX -> PosY -> Void)    -- Offset
                    , (Name -> Void)            -- Rename
                    , (PosZ -> Void)            -- SetZ
                    , (Email -> Void)           -- Change Email
                    , (Phone -> Void)           -- Change Phone
                    , (IpAddr -> Void)          -- Change IpAddr
                    );
data MediaMiEntity  = MediaMiEntity (Integer, MapItem
                    , (PosX -> PosY -> Void)    -- MoveTo
                    , (PosX -> PosY -> Void)    -- Offset
                    , (Name -> Void)            -- Rename
                    , (PosZ -> Void)            -- SetZ
                    , (Url -> Void)             -- Change Url
                    );
data InlineMiEntity = InlineMiEntity (Integer, MapItem
                    , (PosX -> PosY -> Void)    -- MoveTo
                    , (PosX -> PosY -> Void)    -- Offset
                    , (Name -> Void)            -- Rename
                    , (PosZ -> Void)            -- SetZ
                    , (Width -> Height -> Void) -- Change Scale
                    );
data Template = Template (Name, String);
-- Tag Relations?
--                  entityID tag
--data PersonTag  = (Integer, Tag)
--data MediaTag   = (Integer, Tag)
--data RFIDTag    = (Integer, Tag)
--------------------------------------
-- GeoSpatial Data Type Constructors
let
    --------------------
    -- Data type constructor and accessor functions
    -- Location
    makeLocation x y z = Location (x, y, z);
    position_x loc = case loc of Location tp -> (Fst tp);;
    position_y loc = case loc of Location tp -> (Fst (Snd tp));;
    position_z loc = case loc of Location tp -> (Snd (Snd tp));;
    intX a = case a of PosX x -> x;;
    intY a = case a of PosY y -> y;;
    intZ a = case a of PosZ z -> z;;
    plusX a b = PosX (plus (intX a) (intX b));
    plusY a b = PosY (plus (intY a) (intY b));
    plusZ a b = PosZ (plus (intZ a) (intZ b));
    -- Person
    makePerson name email phone ipaddr = Person (name, email, phone, ipaddr);
--      personName (Person (Name n,_,_,_)) = n    -- Preferred syntax.. (pattern match on person structure)
    personName  person = case person of Person tpl -> (Fst tpl);;
    email       person = case person of Person tpl -> (Fst (Snd tpl));;
    phone       person = case person of Person tpl -> (Fst (Snd (Snd tpl)));;
    personIpAddr person = case person of Person tpl -> (Snd (Snd (Snd tpl)));;
    -- Media
    makeMedia    title mime url = Media (title, mime, url);
    makeMediaStr title mime url = makeMedia (Name title) (Mime mime) (Url url);
```

TABLE 1-continued

Example Program Listing for GeoSpatial Application

```
        title    media = case media of Media tpl -> (Fst tpl);;
        mime    media = case media of Media tpl -> (Fst (Snd tpl));;
        url     media = case media of Media tpl -> (Snd (Snd tpl));;
        -- Rfid
        makeRfid mac name group category = Rfid (mac, name, group,
category);
        macAddr    rfid = case rfid of Rfid tpl -> (Fst tpl);;
        rfidName   rfid = case rfid of Rfid tpl -> (Fst (Snd tpl));;
        group      rfid = case rfid of Rfid tpl -> Fst (Snd (Snd tpl));;
        category   rfid = case rfid of Rfid tpl -> Snd (Snd (Snd tpl));;
        -- Scale
        makeScale       width height = Scale (width, height);
        makeScaleInt    width height = makeScale (Width width) (Height
height);
        width    scale = case scale of Scale tpl -> (Fst tpl);;
        height   scale = case scale of Scale tpl -> (Snd tpl);;
        -- InlineMedia
        makeInline media scale = Inline (media, scale);
        media inline = case inline of Inline tpl -> (Fst tpl);;
        scale inline = case inline of Inline tpl -> (Snd tpl);;
        -- Video
        makeVideo    name brand ipaddr = Video (name, brand, ipaddr);
        videoName    video = case video of Video tpl -> (Fst tpl);;
        brand        video = case video of Video tpl -> (Fst (Snd tpl));;
        videoIpAddr  video = case video of Video tpl -> (Snd (Snd tpl));;
        -- Item
        makePersonItem   person   = PersonItem    person;
        makeMediaItem    media    = MediaItem     media;
        makeRfidItem     rfid     = RfidItem      rfid;
        makeInlineItem   inline   = InlineItem    inline;
        makeVideoItem    video    = VideoItem     video;
        makeStringItem   str      = StringItem    str;
        itemCase item pfunc mfunc rfunc ifunc vfunc sfunc
                    = case item of
                                PersonItem    a -> pfunc a;
                                MediaItem     a -> mfunc a;
                                RfidItem      a -> rfunc a;
                                InlineItem    a -> ifunc a;
                                VideoItem     a -> vfunc a;
                                StringItem    a -> sfunc a;;
        -- MapItem
        makeMapItem item loc = MapItem (item, loc);
        item        mapItem = case mapItem of MapItem tpl -> Fst tpl;;
        location    mapItem = case mapItem of MapItem tpl -> Snd tpl;;
{-
--------------------
-- Build Generic Entity Structures
        makeEntity -- ::(Integer -> MapItem -> a -> Entity)
             eid::Integer
             mapItem::MapItem
             funcs = (eid, mapItem, funcs);
        firstFn ntt::(Integer,MapItem,a)    = Snd (Snd ntt);
        nextFn fnz::(a,b)                   = Snd fnz;
-}
--------------------
-- MapItem Entity
        ---------------------
        -- These are the state transition functions for the "MapItem"
state machine.
        --   Given the current state, and parameters for updating it,
build the updated state.
        doMoveTo --  ::(PosX -> PosY -> MapItem -> MapItem)
                  x::PosX
                  y::PosY
              mapItem::MapItem
                  =
                              let   loc   {-::Location-}   = location mapItem;
                                    z     {-::PosZ-}       = position_z loc;
                                    it    {-::Item-}       = item mapItem;
                                    ne    {-::Location-}   = makeLocation x y z;
                              in
                                    makeMapItem it ne;
        doOffset    x::PosX
                    y::PosY
              mapItem::MapItem
                  =
                              let
                                    loc    {-::Location    -} = location mapItem;
```

TABLE 1-continued

Example Program Listing for GeoSpatial Application

```
                              old_x    {-::PosX    -} = position_x loc;
                              old_y    {-::PosY    -} = position_y loc;
                              new_x    {-::PosX    -} = plusX x old_x;
                              new_y    {-::PosY    -} = plusY y old_y;
                              z        {-::PosZ    -} = position_z loc;
                       in
                              makeMapItem (item mapItem) (makeLocation
new_x new_y z);
     doSetZ       = (\z mapItem ->
                       let    loc            = location mapItem;
                              x              = position_x loc;
                              y              = position_y loc;
                       in
                              makeMapItem (item mapItem) (makeLocation x
y z));
     doRename new -- ::Name
              mapItem {-::MapItem-} =
                       makeMapItem
                              (itemCase (item mapItem)
                                     (\person -> makePersonItem    (makePerson
new (email person) (phone person) (personIpAddr person)))
                                     (\media  -> makeMediaItem     (makeMedia
new (mime media) (url media)))
                                     (\rfid   -> makeRfidItem      (makeRfid
(macAddr rfid) new (group rfid) (category rfid)))
                                     (\inline -> makeInlineItem    (makeInline
(makeMedia new (mime (media inline)) (url (media inline)))
(scale inline)))
                                     (\video  -> makeVideoItem     (makeVideo
new (brand video) (videoIpAddr video)))
                                     (\str    -> makeStringItem new)
                                     )
                                     (location mapItem);
     ---------------------
     -- API for MapItem Objects
     --
     getId ntt{-::MapItemEntity-} = case ntt of MapItemEntity tpl ->
Fst tpl;;
     entity ntt{-::MapItemEntity-} = case ntt of MapItemEntity tpl ->
Fst (Snd tpl);;
     moveTo eid::Integer x::PosX y::PosY = UpdateMapItem (doMoveTo x y,
Eid eid);
     offset eid::Integer x::PosX y::PosY = UpdateMapItem (doOffset x y,
Eid eid);
     rename eid::Integer new::Name = UpdateMapItem (doRename new, Eid
eid);
     setZ eid::Integer z::PosZ = UpdateMapItem (doSetZ z , Eid
eid);
     ---------------------
     -- This builds a "MapItem" state machine, given the entity ID and
a reference state
     --       (the reference state is not used as the base for updates;
updates are made to the database version directly)
     makeMapItemEntity
                 eid         ::Integer
                 mapItem     ::MapItem
                 {-funcs-} = MapItemEntity (eid, mapItem, moveTo eid,
offset eid, rename eid, setZ eid {-, funcs-});
     ---------------------
     entityMapItem   {-::(Integer -> MapItem)-}
                 eid    {-::Integer-} = EntityMapItem (Eid eid);
     allEntityMapItem _     = map (\pr -> makeMapItemEntity (Fst pr) (Snd
pr) {-Null-}) (AllEntityMapItem);
     allEntityHistoryMapItem _ = map (\tupl -> let -- Flatten
Historical items into an Entity List
                                            eid    = Fst tupl;
                                            entry  = Fst (Snd
tupl);
                                            time   = Fst (Snd (Snd
tupl));
                                            ntt    = Snd (Snd (Snd
tupl));
                                     in makeMapItemEntity eid
ntt {-Null-}) (AllEntityHistoryMapItem);
     ---------------------
     setZFromTop eid offZ {-::Integer-} = let
                       lst = AllEntityMapItem;
                       max = catalist 0 (\pr {-
```

TABLE 1-continued

Example Program Listing for GeoSpatial Application

```
::((Integer,MapItem),Integer)-} ->
                                  let
                                       mi   {-::MapItem-}      = Snd (Fst pr);
                                       loc  {-::Location-}     = location mi;
                                       curZ {-::Integer-}      = intZ
(position_z loc);
                                       max {-::Integer-} = Snd pr;
                                   in cond (\_ -> gt curZ max) ((\_ ->
curZ), (\_ -> max)) 0) lst;
                                    newZ = plus max offZ;
                                in setZ eid (PosZ newZ);
---------------------
-- Person Entity
     doNewEmail    = (\new mapItem ->
                          makeMapItem
                              (itemCase (item mapItem)
                                      (\person -> makePersonItem
(makePerson (personName person) new (phone person) (personIpAddr
person)))
                                      makeMediaItem
                                      makeRfidItem
                                      makeInlineItem
                                      makeVideoItem
                                      makeStringItem)
                              (location mapItem));
     doNewPhone  = (\new mapItem ->
                          makeMapItem
                              (itemCase (item mapItem)
                                      (\person -> makePersonItem
(makePerson (personName person) (email person) new (personIpAddr
person)))
                                      makeMediaItem
                                      makeRfidItem
                                      makeInlineItem
                                      makeVideoItem
                                      makeStringItem)
                              (location mapItem));
     doNewIpAddr  = (\new mapItem ->
                          makeMapItem
                              (itemCase (item mapItem)
                                      (\person -> makePersonItem
(makePerson (personName person) (email person) (phone person) new))
                                      makeMediaItem
                                      makeRfidItem
                                      makeInlineItem
                                      makeVideoItem
                                      makeStringItem)
                              (location mapItem));
     changeEmail eid::Integer new::Email = (UpdateMapItem)
((doNewEmail new), (Eid eid));
     changePhone eid::Integer new::Phone = (UpdateMapItem)
((doNewPhone new), (Eid eid));
     changeIpAddr eid::Integer new::IpAddr = (UpdateMapItem)
((doNewIpAddr new), (Eid eid));
     pmeMoveTo         ntt = case ntt of PersonMiEntity tpl -> Fst (Snd
(Snd tpl));;
     pmeOffset         ntt = case ntt of PersonMiEntity tpl -> Fst (Snd
(Snd (Snd tpl)));;
     pmeRename         ntt = case ntt of PersonMiEntity tpl -> Fst (Snd
(Snd (Snd (Snd tpl))));;
     pmeSetZ           ntt = case ntt of PersonMiEntity tpl -> Fst (Snd
(Snd (Snd (Snd (Snd tpl)))));;
     pmeChangeEmail    ntt = case ntt of PersonMiEntity tpl -> Fst (Snd
(Snd (Snd (Snd (Snd tpl))))));;
     pmeChangePhone    ntt = case ntt of PersonMiEntity tpl -> Fst (Snd
(Snd (Snd (Snd (Snd (Snd tpl)))))));;
     pmeChangeIpAddr   ntt = case ntt of PersonMiEntity tpl -> Snd (Snd
(Snd (Snd (Snd (Snd (Snd tpl)))))));;
     -- This builds a "MapItemPerson" state machine, given the entity
ID and a reference state
     --    (the reference state is not used as the base for updates;
updates are made to the database version directly)
     makeMapItemPersonEntity :: (Integer -> MapItem -> PersonMiEntity)
               eid ::Integer
               mapItemPerson::MapItem =
                         PersonMiEntity (eid, mapItemPerson, moveTo
eid, offset eid, rename eid, setZ eid, changeEmail eid, changePhone
eid, changeIpAddr eid);
```

TABLE 1-continued

Example Program Listing for GeoSpatial Application

```
----------------------
-- Media Entity
    doNewUrl new mapItem =
                     makeMapItem
                         (itemCase (item mapItem)
                              makePersonItem
                              (\media -> makeMediaItem
(makeMedia (title media) (mime media) new))
                              makeRfidItem
                              makeInlineItem
                              makeVideoItem
                              makeStringItem)
                         (location mapItem);
    changeUrl eid::Integer new::Url = (UpdateMapItem) ((doNewUrl new),
(Eid eid));
    makeMapItemMediaEntity {-::(Integer -> MapItem -> MediaMiEntity)-}
           eid {-::Integer-}
           mapItemMedia {-::MapItem-} =
                    MediaMiEntity (eid, mapItemMedia, moveTo
eid, offset eid, rename eid, setZ eid, changeUrl eid);
----------------------
-- Inline Entity
    doNewScale  = (\w h mapItem ->
                    makeMapItem
                       (itemCase (item mapItem)
                           makePersonItem
                           makeMediaItem
                           makeRfidItem
                           (\inline -> makeInlineItem
(makeInline (media inline) (makeScale w h)))
                           makeVideoItem
                           makeStringItem)
                       (location mapItem));
    changeScale eid::Integer w::Width h::Height = (UpdateMapItem)
((doNewScale w h), (Eid eid));
    makeMapItemInlineEntity {-::(Integer -> MapItem ->
InlineMiEntity)-}
           eid {-::Integer-}
           mapItemInline {-::MapItem-} =
                    InlineMiEntity (eid, mapItemInline, moveTo
eid, offset eid, rename eid, setZ eid, changeScale eid);
----------------------
-- Application Functions
    ---------------------
    -- Cannonical predicate filter for rectangular regions (curry-
able)
    regionFilter = (\low high loc ->
        let  lx  = (position_x low );
             ly  = (position_y low );
             hx  = (position_x high);
             hy  = (position_y high);
             ox  = (position_x loc );
             oy  = (position_y loc ); in
             (and (and (gte ox lx) (gte oy ly)) (and (lte ox hx) (lte oy
hy)))
        );
---------------------
-- Application Interface
        ------------------------
        -- User Entities
        nowhere     = makeLocation (PosX 0) (PosY 0) (PosZ 0);
        emptyP      = makePerson (Name "Nobody") (Email " ") (Phone " ")
(IpAddr " ");
        emptyPI     = makePersonItem emptyP;
        emptyPMI    = makeMapItem emptyPI nowhere;
        inlineZ     = PosZ 10;
        nonInlineZ  = PosZ 100;
        personZ     = PosZ 120;
        ------------------------
        -- Person Entities
        --
        -- Create a new user
        createPersonLoc nam emai phon ipadd loc =
                    case ((CreateMapItem) (makeMapItem (makePersonItem
(makePerson nam emai phon ipadd)) loc)) of
                        Fail              -> Eid -1;
                        CreatedEid eid    -> Eid eid;;
        createPerson    = (\nam emai phon ipadd -> createPersonLoc nam
```

TABLE 1-continued

Example Program Listing for GeoSpatial Application

```
emai phon ipadd (makeLocation (PosX 0) (PosY 0) personZ));
     getPerson eid    = makeMapItemPersonEntity eid (entityMapItem eid);
     newLoginLoc      = createPersonLoc;
     newLogin         = createPerson;
     newLoginStr n e p i = createPerson (Name n) (Email e) (Phone p)
(IpAddr i);
-- Login an existing user (given an eid); returns copy of current
user structure.
     login            = getPerson;
     logout           = (\eid -> eid);
     isPersonWith {-::((Person -> Truth) -> MapItem -> Truth)-}
p::(Person -> Truth) mi =
                        (itemCase (item mi)
                          p                 -- 'p' is a function from
Person -> Bool
                          (\media    -> False)
                          (\rfid     -> False)
                          (\inline   -> False)
                          (\video    -> False)
                          (\str      -> False));
     isPerson = isPersonWith (\_ -> True);
     getPersonByIp ip {-::String-} = map (\pr ->
makeMapItemPersonEntity (Fst pr) (Snd pr))
                        (filter (\pr -> isPersonWith (\p {-
::Person-} -> eq ip (personIpAddr p)) (Snd pr))
                              (AllEntityMapItem));
------------------------
-- MapItem Entities
     createMapItem mi =   case ((CreateMapItem) mi) of
                          Fail             -> Eid -1;
                          CreatedEid eid   -> Eid eid;;
     getMapItem    eid =  makeMapItemEntity eid (entityMapItem eid) {-
Null-};
------------------------
-- Media Entities
     createMediaLoc titl mim ur loc =
                        case ((CreateMapItem) (makeMapItem (makeMediaItem
(makeMedia titl mim ur)) loc)) of
                          Fail             -> Eid -1;
                          CreatedEid eid   -> Eid eid;;
     createMedia   titl mim ur = createMediaLoc titl mim ur
(makeLocation (PosX 0) (PosY 0) nonInlineZ);
     createMediaStr titl mim ur = createMedia (Name titl) (Mime mim)
(Url ur);
     getMedia   eid = makeMapItemMediaEntity eid (entityMapItem eid);
------------------------
-- Rfid Entities
     createRfidLoc mac name group category loc =
                        case ((CreateMapItem) (makeMapItem (makeRfidItem
(makeRfid mac name group category)) loc)) of
                          Fail             -> Eid -1;
                          CreatedEid eid   -> Eid eid;;
     createRfid mac name group category = createRfidLoc mac name group
category (makeLocation (PosX 0) (PosY 0) nonInlineZ);
     createRfidStr mac name group category = createRfid (MacAddr mac)
(Name name) group category;
     getRfid          = getMapItem;
     isRfidWith p mi {-::MapItem-} = (itemCase (item mi)
                          (\person   -> False)
                          (\media    -> False)
                          p                 -- 'p' is a function from
Rfid -> Bool
                          (\inline   -> False)
                          (\video    -> False)
                          (\str      -> False));
     isRfid = isRfidWith    (\_ -> True);
     getTagByMac m = map (\pr -> makeMapItemEntity (Fst pr) (Snd pr) {-
Null-})
                        (filter (\pr -> isRfidWith (\r -> eq m
(macAddr r)) (Snd pr))
                              (AllEntityMapItem));
------------------------
-- InlineMedia Entities
     createInlineLoc media scale loc =
                        case ((CreateMapItem) (makeMapItem
(makeInlineItem (makeInline media scale)) loc)) of
                          Fail           -> Eid -1;
                          CreatedEid eid -> Eid eid;;
```

TABLE 1-continued

Example Program Listing for GeoSpatial Application

```
        createInline media scale = createInlineLoc media scale
(makeLocation (PosX 0) (PosY 0) inlineZ);
        getInline eid     = makeMapItemInlineEntity eid (entityMapItem eid);
--    isInlineWith p mi::MapItem = (itemCase (item mi)
--                                    (\person   -> False)
--                                    (\media    -> False)
--                                    (\rfid     -> False)
--                                    p             -- 'p' is a function
from Inline -> Bool
--                                    (\video    -> False)
--                                    (\str      -> False));
--    isInline = isInlineWith (\_ -> True);
        isInline mi {-::MapItem-} = (itemCase (item mi)
                                        (\person   -> False)
                                        (\media    -> False)
                                        (\rfid     -> False)
                                        (\inline   -> True )
                                        (\video    -> False)
                                        (\str      -> False));
--    getInlineByTitle n = map (\pr -> makeMapItemInlineEntity (Fst .
pr) (Snd . pr) Null)
--                              (filter (\pr -> isInlineWith (\r -> eq n
(title (media r))) (Snd . pr))
--                              (AllEntityMapItem));
        ------------------------
        -- Video Entities
        createVideoLoc video loc =
                    case ((CreateMapItem) (makeMapItem (makeVideoItem
video) loc)) of
                            Fail             -> Eid -1;
                            CreatedEid eid   -> Eid eid;;
        createVideo name brand ipaddr = createVideoLoc (makeVideo name
brand ipaddr) (makeLocation (PosX 0) (PosY 0) nonInlineZ);
        createVideoStr name brand ipaddr = createVideo (Name name) brand
(IpAddr ipaddr);
        getVideo        = getMapItem;
        ------------------------
        -- String Entities
        createStringLoc str loc =
                    case ((CreateMapItem) (makeMapItem
(makeStringItem str) loc)) of
                            Fail             -> Eid -1;
                            CreatedEid eid   -> Eid eid;;
        createString str = createStringLoc str (makeLocation (PosX 0)
(PosY 0) nonInlineZ);
        getString             = getMapItem;
        ------------------------
        -- Given a list of IDs, use the getter to generate all matching
items and concatenate the resulting list.
        getWithFilter getter {-::(a -> TList b)-} list {-::(TList a)-} =
                    catalist Null (\pr -> let
                            id      = Fst pr;
                            lst     = Snd pr;
                            pers    = getter id;      -- Returns a
list of items matching the filter (possibly Null)
                            in cat pers lst) list;    -- Concatenate
the lists of items together
        ------------------------
        -- Given a list of (ID, ARG), and a getter, get all the items and
zip them with the arguments provided
        getAndZipWithFilter -- ::((a -> TList b) -> TList (a,c) -> TList
(a,c))
                    getter -- ::(a -> TList b)
                    listA {-::(TList (a,c))-} =
                            catalist Null (\pr -> let
                                    tupl    = Fst pr;
                                    lst     = Snd pr;
                                    id      = Fst tupl;
                                    arg     = Snd tupl;
                                    itm     = getter id;            --
Returns a list of items matching the filter (possibly Null)
                                    iarg = map (\i -> (i,arg)) itm;  -- Zip
the argument with each item
                                    in cat iarg lst) listA;          --
Concatenate the lists of items together
        applyOpToNttList op = catalist Void (\pr -> let
                                    tupl    = Fst pr;
                                    vod     = Snd pr;
```

TABLE 1-continued

Example Program Listing for GeoSpatial Application

```
                              ntt    = Fst tupl;
                              arg    = Snd tupl;
                              in op ntt arg);
    hysteresis new_x new_y old_x old_y = let
                              -- Returns True if the new value is within
some distance of the old value
                              --   (ie: True = no change)
                              histX = 130; -- Units are in Inches.
These values were chosen by watching the movement of the OQOs
                              histY = 90;    --
under normal conditions in the cube for some minutes.
                              newx   = intX new_x;
                              newy   = intY new_y;
                              oldx   = intX old_x;
                              oldy   = intY old_y;
                              lowx   = minus oldx histX;
                              lowy   = minus oldy histY;
                              highx  = plus oldx histX;
                              highy  = plus oldy histY;
                              in and (and (lte lowx newx) (lte lowy
newy)) (and (gte highx newx) (gte highy newy));
    moveIfNewLoc move ntt newXY = let
                              mi    = entity ntt;
                              loc   = location mi;
                              x     = position_x loc;
                              y     = position_y loc;
                              in cond (\pr -> hysteresis (Fst pr)
(Snd pr) x y)          -- Only update if (x,y) has moved enough.
                                    ( (\pr -> Void)
-- If no change, do nothing!
                                    , (\pr -> move (getId ntt)
(Fst pr) (Snd pr))) -- If a change occured, move the item.
                                    newXY;
    updatePersonAndRfid listP listR = let
                              updateTags = applyOpToNttList (moveIfNewLoc
moveTo) (getAndZipWithFilter getTagByMac listR);
                              updatePers = applyOpToNttList (moveIfNewLoc
moveTo) (getAndZipWithFilter getPersonByIp listP);
                              in (updateTags, updatePers);
In
```

The GeoSpatial application specified in Table 1 is written in the SML language as described previously. For example, the GeoSpatial application does not express computing system operations to be performed, rather it is written as a specification that describes functions to be performed. Hence, operations such as reading/writing a data structure from/to a memory location, etc., are not specified because operations such as hardware-based attributes associated with memory persistence, memory pointers, data distribution etc. are opaque to the writer of the SML application, rather the SML application describes how data elements are extracted from existing data structures in order to create new data structures.

The GeoSpatial application specified in Table 1 utilizes the following example SML language syntax: a line starting with a double dash "- -" denotes a comment; a line starting with "data" denotes a declaration of a data structure; an equal sign "=" denotes "is"; an expression ending with a semicolon ";" denotes an end of the expression; a line starting with a string other than "data" defines the string as a lambda function, where space-separated values following the string denote required input parameters in a required ordering; an expression ending with a double semicolon ";;" denotes a condition; comma-separated items in parenthesis are presented in a required ordering; a dash and arrow "a->b" denotes that the example specified lambda function "a" returns "b"; a vertical line "|" represents a Boolean "OR"; values in parenthesis separated by a dash and arrow (e.g., "(PosX->PosY->Void)" denotes required parameters "PosX" and "PosY" for a lambda function that returns a typeless answer ("Void"), where "Void" is equivalent to a Null operation; a double colon "::"denotes "is of type"; a dash and double colon sign (e.g., "-::" or "-- ::") denotes "is defined as"; the reference "_" following a specified lambda function indicates that any input can be accepted, and "\pr" is a lambda function indicating an input of any type is accepted so long as the input can be passed to a referenced lambda function. Additional syntax will become apparent from the following description.

FIG. 6 illustrates establishment of the strongly typed definitions for the elements of the geospatial application of Table 1, according to an example embodiment. The geospatial application first relies on semantic and primitive requirements established by the symbol manipulation language 16 and enforced in step 74 by the compiler circuit 38 based on the axiom constraints 32 and system constraints 34 of FIG. 1. Example semantic types at the semantic level include, for example string, integer, etc.

The geospatial application 14 relies on the base semantic types in providing strongly typed definitions for types at the type level in step 76, where each type can be a tuple, a sum, or a lambda function. For example, the data structure "Name" (illustrated in FIG. 7 as within the data structures 90a, 90b, 90c, 90j, and/or 90h) has a strongly typed definition at the semantic level to be a string, and to be of the type Name; the data structure "PosX" (representing a position in the "x" dimension in an x-y-z coordinate system) has a strongly typed definition at the semantic level to be an integer, and to be of the type "PosX".

Figure 7:
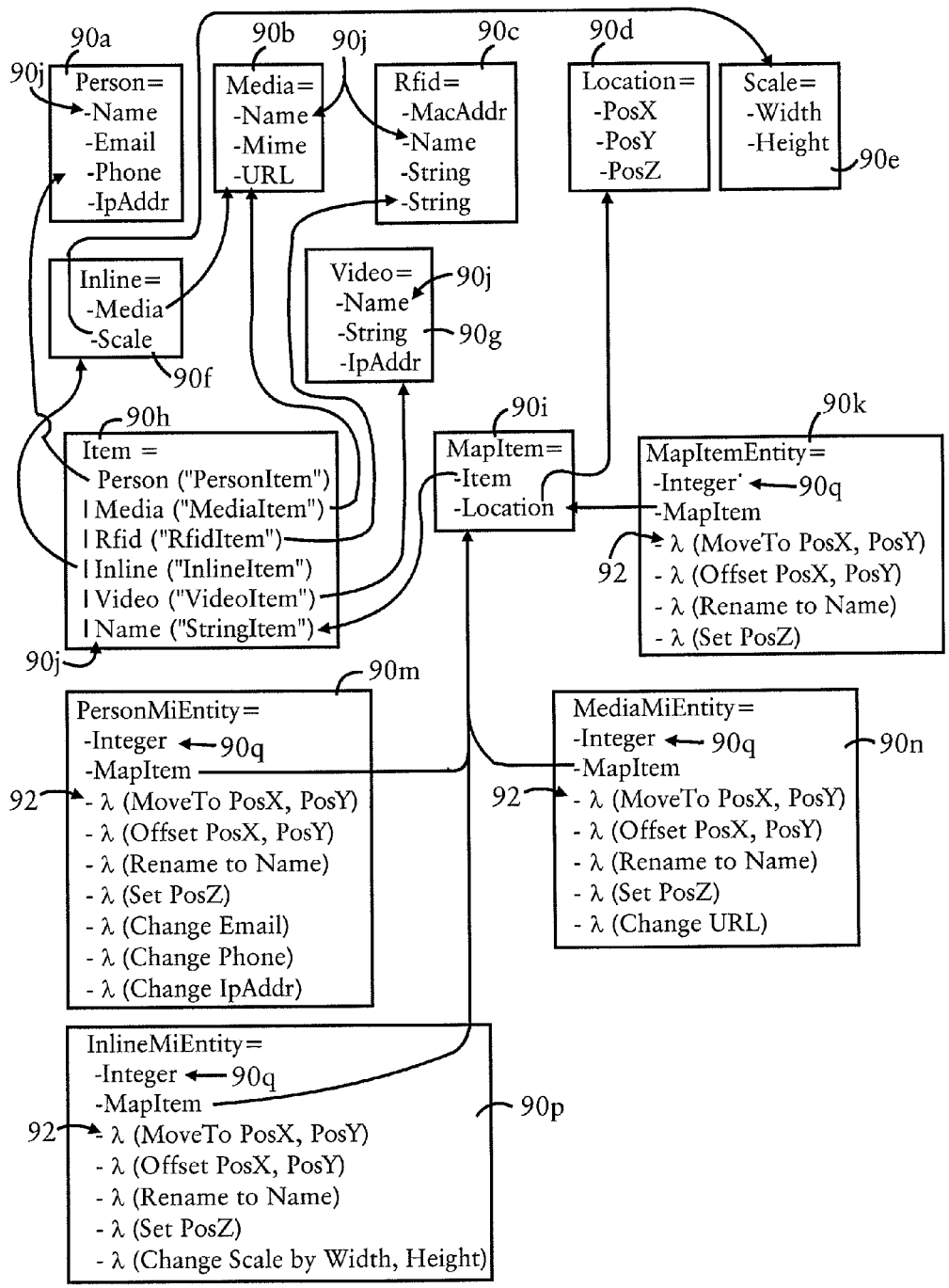
FIG. 7 illustrates example data structures of an example geospatial application having strongly typed definitions at the algebraic data type level, according to an example embodiment.

Declarations also can define in step 78 data structures as algebraic data types consisting of predefined types, i.e., strongly typed data attributes associated with an entity such as a user; for example, the data structure "Person" 90*a* of FIG. 7 has a strongly typed definition as a Sum consisting strongly typed data attributes of the predefined types Name, Email, Phone, and IpAddr, that are expressed in the specified order. Additional declarations provide strongly typed definitions of the Sums "Media" 90*b*, "Rfid" 90*c*, "Location" 90*d*, "Scale" 90*e*, "Inline" 90*f*, and "Video" 90*g*. Hence, a declaration providing a strongly typed definition of an algebraic data type consisting of a plurality of specified types will explicitly specify the ordering that is required for the specified types. Alternately, a Sum can be specified to have a strongly typed definition to include any one of multiple distinct predefined types: for example, the data structure "Item" 90*h* is a Sum that can contain any one of a "Person" data structure (referred to as a "PersonItem") 90*a*, a "Media" data structure (referred to as a "MediaItem") 90*b*, a "Rfid" data structure (referred to as a "RfidItem") 90*c*, an "Inline" data structure (referred to as an "InlineItem") 90*f*, a "Video" data structure (referred to as a "VideoItem") 90*g*, or a "Name" data structure (referred to as a "StringItem") 90*j*.

Another data structure called "MapItem" 90*i* has a strongly typed definition as having the algebraic data type "MapItem" (i.e., a Sum) consisting of the predefined types "Item" 90*h* and "Location" 90*d*, in that order; hence, each MapItem data structure represents a particular item (of type "PersonItem", "MediaItem", "RfidItem", "InlineItem", "VideoItem", or "StringItem") having an identifiable location in the Geospatial application. The algebraic data type (i.e., Sum) "MapItem" 90*i* also is used in the strongly typed definition of the data structure labeled "MapItemEntity" 90*k* that is defined as having the algebraic data type "MapItemEntity" and consisting of, in order, the data structure "Integer", the data structure "MapItem" 90*i*, followed by four lambda functions 92 that return void results (i.e., no results), the four lambda functions are identified as "MoveTo", "Offset", "Rename", and "SetZ".

Similar strongly typed definitions are provided in step 78 for the respective algebraic data types "PersonMiEntity" (also referred to as "person map item entity") 90*m*, "MediaMIEntity" (also referred to as "media map item entity") 90*n*, and "InlineMiEntity" (also referred to as "in-line map item entity" 90*p*, each algebraic data type defined as containing the prescribed types "Integer" 90*q* and "MapItem" 90*i*, plus prescribed lambda functions 92 for manipulation and/or modification of the associated data structures.

In addition to the geospatial application of Table 1, prescribed primitives can be supplied to the transformation system 12 (e.g., in the form of an SML application 14*a* with new features) that provides support for primitive types not defined explicitly in the geospatial application. For example, the following primitive types can be injected into the transformation system 12 to provide support for behaviors of an executable system that has inductive types and monads. Example primitive types that can be injected into the transformation system for support of the geospatial application include "AllEntityHistory*" (a primitive providing an inductive operation over a monad), "AllEntity*" (a primitive providing an inductive operation over a monad), "Entity*" (a primitive providing a monadic operation), "Update*" (a primitive providing a monadic operation), and "Create*" (a primitive providing a monadic operation).

The geospatial application of Table 1 in step 80 provides strongly typed definitions (specified in the portion "GeoSpatial Data Type Constructors") for lambda functions 92 (e.g., "makeLocation", "makePerson" 92*a* of FIG. 8A, "makeMedia", "makeRfid", "makeScale", "makeInline", "makeVideo", "makeMapItem" 92*b* of FIG. 8A) for constructing prescribed data types. Additional strongly typed definitions define lambda functions 92 for constructing data structures that are specific to a type of item (PersonItem, MediaItem, RfidItem, InlineItem, VideoItem, and StringItem). For example, the "makeMapItem" lambda function 92*b* applies the inputs "item" and "loc" (in that order) and returns the data structure "MapItem" (of type "MapItem") 90*i* having the tuples "(item, loc)". The accessor lambda function "item" (listed below the "makeMapItem" lambda function) can obtain the "mapItem" data structure (of type "MapItem") 90*i* as an input and return the "item" data structure from the first part of the tuple ("Fst tpl") from the retrieved (input) "mapItem" data structure 90*i*; the accessor lambda function "location" can retrieve the "mapItem" data structure as an input and return the "location" data structure from the second part of the tuple ("Snd tpl") from the "mapItem" data structure (of type "MapItem") 90*i*. Additional strongly typed definitions (e.g., "personName", "email", "phone", "personIpAddr", etc.) define lambda functions for extracting selected values from identified data structures of defined types based on validating that the extracted value satisfies the prescribed typing discipline (e.g., "personName person=case person of Person tpl->(Fst tpl);;"). As described below, these lambda functions can extract the selected data values for various operations in the geospatial application, including creating a new data structure, or initiating a multimedia communications session between selected entities within a geospatial region (two or three-dimensional) selected by a user.

The lambda function "makeEntity" (following the comment "Build Generic Entity Structures") enables the construction of a generic Type in the geospatial application, referred to as "Entity", that is a algebraic data type (e.g., a Sum) that contains the variables "eid" (entity identifier) of type Integer 90*q*, "mapItem" of type MapItem 90*i*, and zero or more lambda functions 92 in that order (the lambda functions "firstFn" and "nextFn" also are declared for retrieving lambda functions from a set "a" of lambda functions 92 that are null terminated. As described in further detail below, the variable "eid" is an entity identifier that uniquely identifies a corresponding entity as the entity progresses over time throughout the GeoSpatial system.

A lambda function 92 also can have a strongly typed definition to perform a specified operation based on identifying a data structure as being an instance of a particular type, illustrated by the "itemCase" lambda function: in the case that an item is an instance of type "PersonItem", the lambda function "itemCase" returns a function "pfunc" on an input "a"; in the case that the item is an instance of type "MediaItem", the lambda function "itemCase" returns a function "mfunc" on the input "a", etc.

As described previously, the GeoSpatial application 14 provides a specification that describes functions to be performed; hence, the strongly typed definitions describe the data to be extracted (or the data structure to be created), without specifying the manner in which the data structure(s) are to be fetched or stored from memory (e.g., a non-transitory computer or machine-readable storage medium).

The geospatial application in step 82 also provides strongly typed definitions for creating new data structures that update a state attribute of a MapItem Entity 90*k*. In particular, a particular attribute of the example embodiment is that no data structure is ever deleted or removed from the geospatial application, nor is any data structure ever overwritten or modified; to the contrary, all data structures are preserved, and each data structure has a corresponding monotonically increasing creation identifier attribute added at the time of its creation (e.g., a temporal attribute such as an epic time value or a time stamp), enabling a complete history of each and every attribute in the geospatial application to be retraced and recreated.

For example, the lambda function "doMoveTo" can create a new instance of an existing MapItem data structure by obtaining the data structures "PosX" (of type "PosX"), "PosY" (of type "PosY"), and "MapItem" (of type "MapItem"), and returning a new data structure "MapItem"; in particular, the data structures "loc", "z", and "it" can be obtained based on applying the respective accessor lambda functions "location" (with input "mapItem"), "position_z" (with input "loc"), and "item" (with input "mapItem") to the existing data structure "mapItem", and a new location can be created using the lambda function "makeLocation" using inputs "x y z" (expressed as "makeLocation x y z"), and returned as variable "ne". Hence, the new data structure "MapItem" of type "MapItem" $90i$ is created using the lambda function "makeMapItem" ($92b$ of FIG. 8A) using inputs "it" and "ne" (expressed as "makeMapItem it ne"), while maintaining the same entity identifier "eid" that establishes the prior data structure "mapItem" and the new data structure "mapItem" as representing the same entity at a different instance in time.

Hence, the history of a particular entity (e.g., a person, media, RFID, Inline, Video, or Name) can be determined based on obtaining all data structures having the same entity identifier "eid"; similarly, all entities having ever been at or near the same location can be determined by identifying all data structures having the same or similar Location data structures (as expressed by the PosX, PosY, and PosZ types); all entities having used the same Internet Protocol (IP) network address can be determined by identifying all data structures having the same value for "IpAddr" of type "String", etc.

Additional declared lambda functions 92 for creating a new data structure that update a state attribute of a MapItem Entity can include "doOffset" (to change the x y position from an existing "mapItem" data structure), "doSetZ" (to change the z position from an existing "mapItem" data structure), and "doRename" (to rename an existing "mapItem" data structure). For example, the "doRename" lambda function 92 applies the input "new" (of type "Name") to the data structure "mapItem" (of type "MapItem") based on applying the lambda function "itemCase" to select the lambda function to be applied for the corresponding determined type for the data structure "item" $90h$ (e.g., type "PersonItem", "MediaItem", "RfidItem", "InlineItem", "VideoItem", or "StringItem"): in the case that the data structure "mapItem" is of type "PersonItem", the lambda function "doRename" causes the lambda function "makePersonItem" $92c$ to apply the input "new" as an input to the "name" variable in the "makePerson" lambda function in "makePersonItem", the remaining variables for the "makePerson" lambda functions retrieved from the existing data structure "mapItem" in the prescribed order by the respective lambda functions "email", "phone", and "personIpAddr" (defined as part of the "makePerson" lambda function); in the case that the data structure "mapItem" is of type "MediaItem", the lambda function "doRename" causes the lambda function "makeMediaItem" to apply the input "new" as an input to the "title" variable in the "makeMedia" lambda function in "makePersonItem", the remaining variables for the "makeMedia" lambda function retrieved from the existing data structure "mapItem" in the prescribed order by the lambda functions "mime" and "url" (defined as part of the "makeMediaStr" lambda function), etc.

The geospatial application also can execute in steps 82 or 84 of FIG. 6 additional declared lambda functions that can include accessor methods for retrieving selected data structures from map item objects and creating new data structures accordingly. For example, the lambda function "getID" can obtain the entity identifier "ntt" as a local variable based on retrieving the first data structure from the first tuple of the "MapItemEntity" data structure $90k$, previously declared (under the "Application Types" Declarations) as being of type "Integer" $90q$; the lambda function "entity" can be used to fetch the data structure of type "MapItem" $90i$ from the second element of the "MapItemEntity" data structure $90k$ (i.e., the first element of the second tuple); the declared lambda functions "moveTo", "offset", "rename", and "setZ" 92 can effectively move, offset, rename, or change the elevation of a specified entity (identified by its entity identifier "eid") based on applying the relevant inputs to the respective lambda functions "doMoveTo" (using inputs "x y"), "doOffset" (using inputs "x y"), "doRename" (using input "new"), and "doSetZ" (using input "z") in the lambda function "UpdateMapItem".

Additional declared lambda functions can create in step 84 new map item entity data structures reflecting an update of a particular entity (identified by its entity identifier), effectively enabling the building of a temporal "MapItem" state machine based on tracking the sequence of map item entity data structures associated with a particular entity identifier. Hence, the geospatial application 14 can search all entities to find all data structures satisfying a selected criterion. For example, the lambda function "entityMapItem" $92g$ of FIG. 8B creates a new data structure having a new entity identifier "Eid" (of type "integer") if no input is specified, else the lambda function returns the data structure of type "MapItem" and associated with the specified input "eid"; the lambda function "allEntityMapItem" is described as a specification of a function that can create a curried list of any data structure to find all data structures satisfying the supplied input condition (the reference "_" indicates that any input can be accepted, and "\pr" is a lambda function indicating an input of any type is accepted so long as the input can be passed to the lambda function "makeMapItemEntity"); further, the specification of the lambda function "allEntityMapItem" referencing itself enables function to be repeated for the next data structure, until a null condition is encountered.

Hence, applying the example input "PersonItem" would return a data structure in the form of a curried list of all items of type "Person" (and labeled as "PersonItem") in the geospatial application, where a null condition would be encountered upon completion that causes the lambda function "allEntityMapItem" to complete its operations (in accordance with the requirements of being non-Turing complete). Similarly, applying the example input "Item" to the lambda function "allEntityMapItem" would return a data structure in the form of a curried list of all items in the geospatial application. Hence, the lambda function "allEntityMapItem" effectively executes as an infinite loop, except that non-Turing completeness is maintained by completing the operation upon encountering a null condition.

As apparent from the foregoing, the curried lists generated by the associated lambda functions 92 can be stored as data structures for further manipulation, for example adding newly created items to the curried lists, or performing filtering operations on the curried lists. Such manipulation of the curried lists enables optimization of the ad hoc geospatial directory, where any computing device can incrementally (and on an ad hoc basis) add new data structures that create new entities, update existing entities, or create/update curried lists for optimization of queries on the ad hoc geospatial directory.

Similarly, the "allEntityHistoryMapItem" lambda function enables the retrieval of an entity identifier ("eid"), an entity data structure ("entry"), a time stamp ("time"), and another entity ("ntt") until a null condition is encountered, in order to return a history of items into an Entity List that lists the history of all entities.

The declared lambda function can create a maximum or minimum value in an identified entity data structure relative to existing entities. For example the "setZFromTop" lambda function can set a maximum "height" (expressed by its "position_z" value) for an identified entity (identified by its entity identifier "eid" input) by adding a height offset (expressed by the height offset "offZ" input) relative to the maximum height (of type "PosZ") of all other existing data structures of type "MapItem". In particular, the "setZFromTop" lambda function first obtains a list of all map items, and determines the maximum based on concatenating the list of map items.

Additional lambda functions can be used for assigning new reachability for a person, for example "doNewEmail" to create a new map item specifying a new e-mail address for reaching the person, "doNewPhone" to create a new map item specifying a new phone number for reaching the person, "doNewIpAddr" to create a new map item specifying a new IP address for reaching the person, or "changeEmail" to create a new map item specifying an alternative e-mail address (superseding the prior e-mail) for reaching the person, or a lambda function for moving a "person map entity" ("pmeMoveTo"), offsetting a person map entity ("pmeOffset"), renaming a person map entity ("pmeRename"), setting a height ("z") of a person map entity ("pmeSetZ"), changing the e-mail address for a person map entity ("pmeChangeEmail"), changing a phone number for a person map entity ("pmeChangePhone"), or changing the IP address for a person map entity ("pmeChangeIpAddr"). Similar lambda functions can be used for assigning new parameters for different entities such as a media entity (e.g., "doNewURL", "changeUrl", "makeMapItemMediaEntity"), or an in-line entities (e.g., "doNewScale", "changeScale", or "makeMapItemInlineEntity"). As described previously, a data structure is never deleted from the system, hence the history of any entity can be traced throughout the geospatial application based on the corresponding entity identifier and indexed, for example, by the associated timestamp values.

Hence, the example embodiments enable precise tracing of events injected into the geospatial application. For example, if a data packet was injected into the system using a particular source IP address and caused a particular event at a certain time (e.g., a malicious attack or a denial of service attack), the example geospatial application can identify the entities that utilized that IP address, and at what point in time that IP address was utilized.

The portion of the geospatial application labeled "Application Functions" declares a lambda function ("regionFilter") that establishes a rectangular filter within the geospatial region: the inputs include x,y coordinates for a "low" position, x,y coordinates for a "high" position, and x,y coordinates for an offset position, the lambda function "regionFilter" being of a type that includes lambda functions (as evidenced by the term "in").

The foregoing primitive terms, types, tuples, sums, lambdas, and the typing on the lambdas described with respect to Table 1 are used to provide underlying semantic and type support for user interface lambda functions (as apparent from the foregoing, there are no explicit Kind types specified in Table 1: although there are Kind types in the types of the lambda functions in the form of type inference, the Kind types are not referenced explicitly in Table 1). As described in further detail below, the previously-described type and lambda functions are not accessible by users of the geospatial application, but provide underlying semantic, type, and application function execution support for user interface lambda functions that are accessible by users of the geospatial application. The previously-described lambda functions also enable optimization of lambda functions execution in the distributed system, based on creation and storage of curried lists, such as a curried list of all entities in a system, a curried list of a history of all entities of a system, etc. These curried lists can be combined, split, etc., as appropriate, for optimization of queries generated by users of the geospatial application.

The geospatial application in step 86 provides strongly typed definitions for lambda functions 92 to be used for providing a visualization by users in the graphical user interface (presentation layer) 36 of the geospatial application as "Application Interface". These example lambda functions can be called by users in the application layer (presentation layer) 36, implemented for example as a command line interface (CLI) or a graphic user interface (GUI), described below. Example lambda functions include the lambda function "nowhere" that establishes a location having a null position (0, 0, 0) in the (x, y, z) coordinate space, where the zeros are strongly typed as types "PosX", "PosY" and "PosZ". Another lambda function "emptyP" enables construction of an "empty" person data structure (i.e., a person is constructed but nothing is declared), where the type "Name" has a value of "Nobody", and the data types "Email", "Phone" and "IpAddr" have empty values, the lambda function "emptyPI" enables construction of an empty person item based on the input of an empty person ("emptyP"), and the lambda function "emptyPMI" enables construction of an empty person map item that utilizes the "makeMapItem" lambda function applying the inputs "emptyPI" and "nowhere" (default "PosZ" representations also are provided for "inlineZ", "nonInlineZ", and "personZ").

A new user can be created in the geospatial application based on the lambda function "createPersonLoc" 92*e* using the sequence of inputs of name, e-mail, phone number, IP address, and location. The lambda function "createPerson" can create a person that has a default location; in contrast to lower-level lambda functions permitting creation of a person with no location, at the geospatial application layer each person is assigned a location, at least a default location. Hence, a user of the geospatial application is not permitted to create an item that does not have a location. The lambda function "getPerson" 92*f* of FIG. 8B enables retrieval of a person data structure 90*h* by their "eid": if no such person exists yet in the system, in the geospatial application will create a new person map item entity (of type "PersonMiEntity") 90*m* based on executing the lambda function "makeMapItemPersonEntity" 92*i* of FIG. 8B. The lambda function "newLoginLoc" 92*d* enables creation of a person data structure 90*a* specifying a location by invoking the "createPersonLoc" lambda function 92*e*, and the lambda function "newLogin" enables creation of a person data structure without any supplied location data (in which case the default location is established using the "createPerson" lambda function). The lambda function "newLoginStr" either creates the person data structure 90*a* with the supplied strongly typed parameters associated with the user ("n" for Name, "e" for e-mail, "p" for phone number, and "i" for IP address), or retrieves an existing person data structure (identified by the corresponding EID) having the supplied parameters. The lambda functions "login" 92h (FIG. 8B) and "logout" also permit a user to login to the system based on the "getPerson" lambda function, and (optionally) logout by nullifying the entity identifier "eid".

The geospatial application 14 also can provide strongly typed definitions in step 88 of lambda functions available at the presentation layer 36 that can generate a concatenated list of items matching a filter constraint. For example, the lambda function "isPersonWith" enables the geospatial application 14 to determine if there is a person associated with a particular entity, enabling identification of one or more persons associated with a particular IP address (as implemented by the lambda function "getPersonByIp").

Figure 8A:
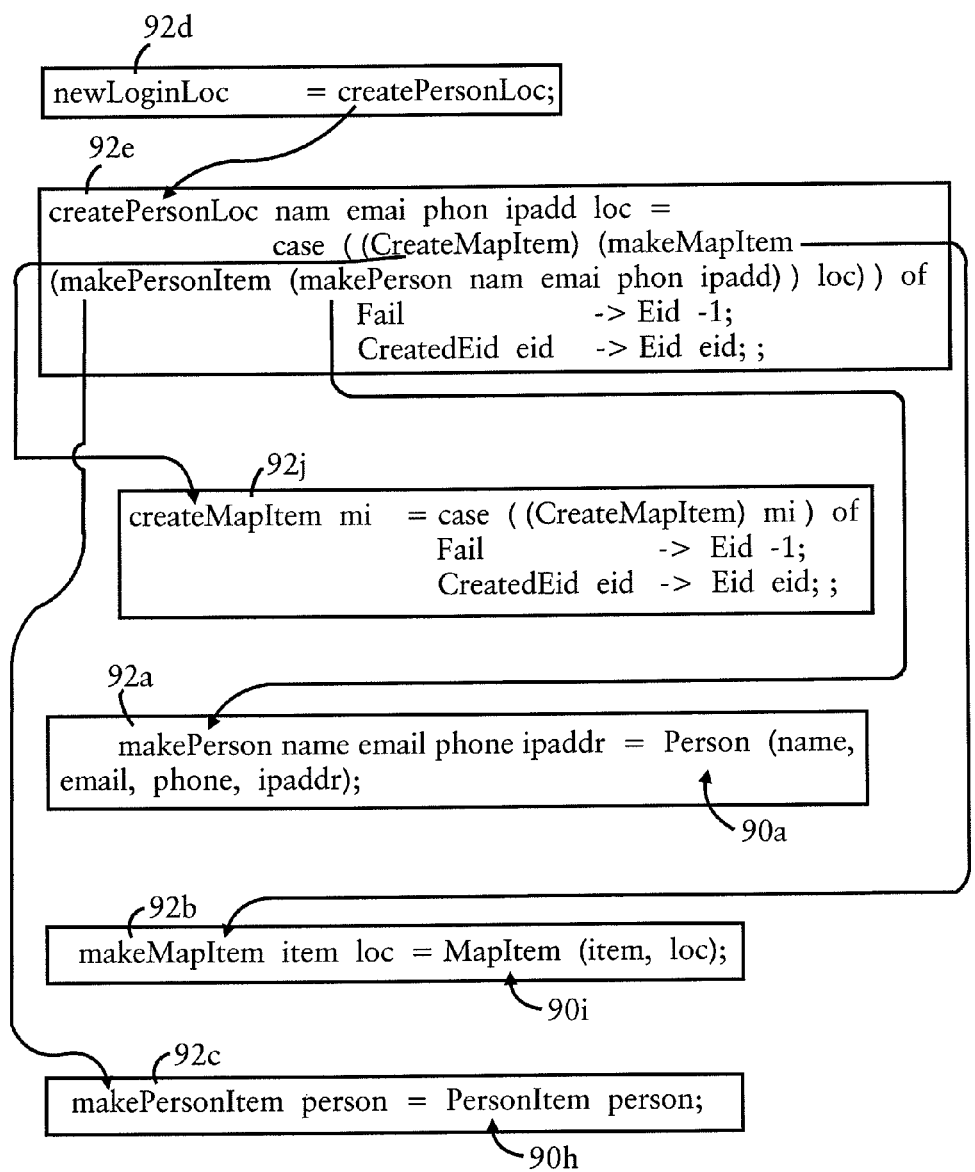
FIGS. 8A and 8B illustrate example strongly typed definitions in a geospatial application for creating a new data structure of a prescribed type, and for executing a prescribed lambda function according to a prescribed type, according to an example embodiment.
Figure 8B:
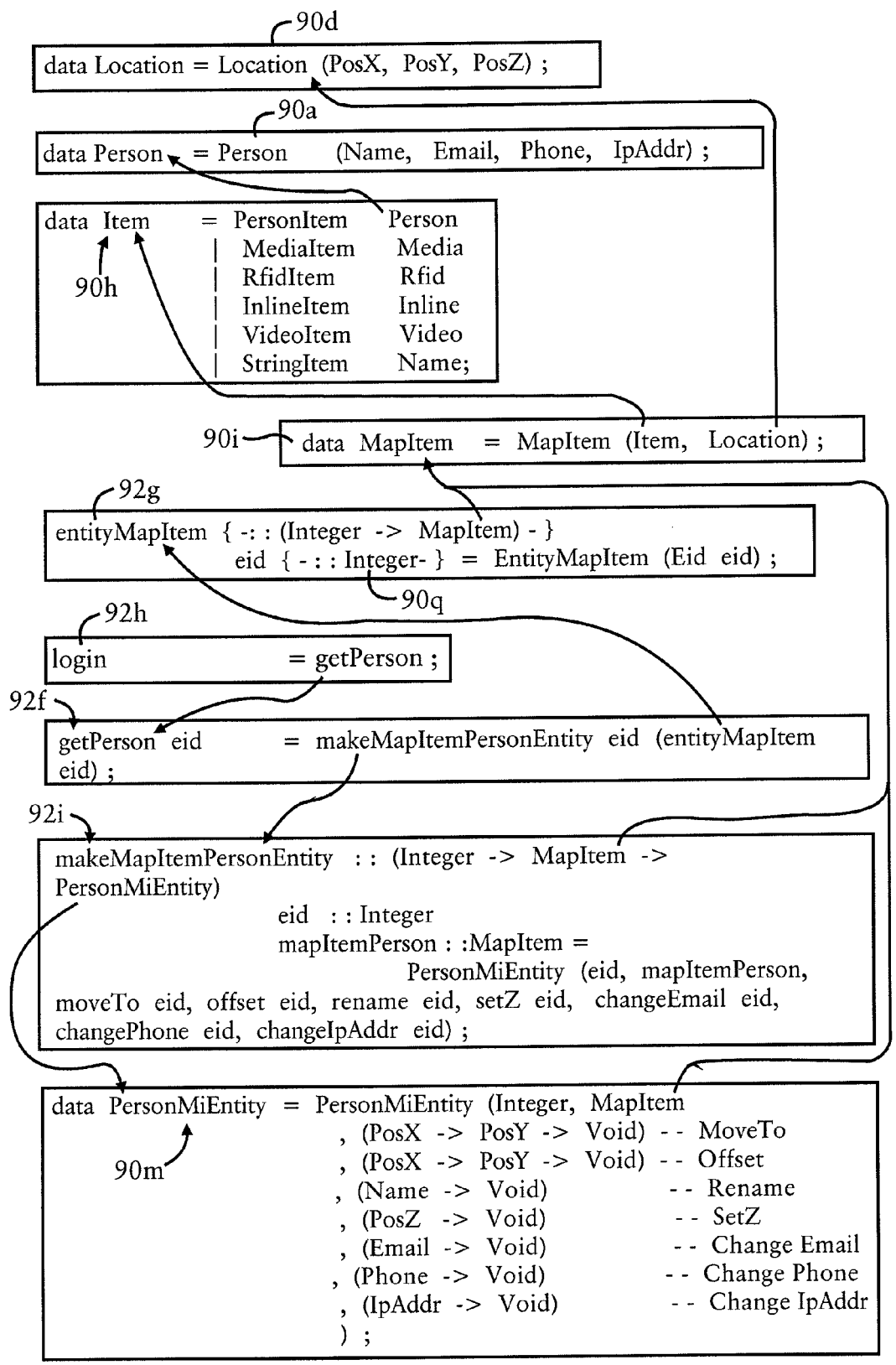

The lambda function "createMapItem" 92j of FIG. 8A enables creation in step 88 of an item and returns the entity identifier to a client application executing the presentation layer, else a "−1" in the case of a fault during creation. The lambda function "getMapItem" enables in step 88 retrieval of a list of all data structures having the specified entity identifier ("eid"), terminated by a null. Hence, any entity can be recalled by its entity identifier "eid". Similar lambda functions in step 88 are specified for creating and accessing media entities, RFID entities, in-line media entities, video entities (for injecting a video camera), and string entities, including associating different entities together (for example, the lambda function "createVideoStr" enables injection of a video stream, and "getVideo" enables retrieval of the video stream by retrieval of the Map item).

The lambda function "getWithFilter" enables creation by the geospatial application in step 88 of a concatenated list of items that satisfy a filter requirement of a list of identifiers (a concatenated list is generated using the command "catalist"; any data structure can be concatenated using the prefix "cata"). The lambda function "getAndZipWithFilter" enables creation by the geospatial application in step 88 of a concatenated list of items that is "zipped" with (i.e. wrapped by) arguments used to obtain the items, similar to a "map fold" operation. For example, assume one wishes to move a list of items (e.g., people) to a new z axis, the function "getAndZipWithFilter" can form a curry of left/right pairs of people with moved z axis values. The lambda function "applyOpToNttList" enables the geospatial application to apply an operator to an existing entity list. The lambda function "hysteresis" can be used with location operations to indicate that if new values for x-y coordinates ("new_x new_y") are within a prescribed distance ("histX", "histY") of an existing value ("old_x old_y"), then the entity is deemed to be at the same location. The lambda function "moveIfNewLoc" enables the geospatial application to move an entity (by creating a new entity data structure) if the new location exceeds the hysteresis limit as specified in the lambda function "moveIfNewLoc". Hence, the lambda function "UpdatePersonAndRfId" enables the geospatial application to generate an updated list of updated RFID tags (by MAC address) and an updated list of Persons by IP address.

Hence, the above-described user interface lambda functions can be invoked by users in the presentation layer (36 of FIG. 1) of the geospatial application. The above-described lambda functions can be invoked based on the users submitting a request for execution of at least one lambda function in an operation of the geospatial application. Further, these application interface functions can be implemented as a command line interface (CLI), Application Programming Interfaces (APIs), or more commonly as a graphic user interface (GUI) to facilitate a executing one or more user functions based on the user submitting a graphic icon-based request that is mapped by the GUI to an explicit lambda function request or a prescribed reference that invokes one or more of the lambda functions.

IV. Example Hardware Overview

Figure 9:
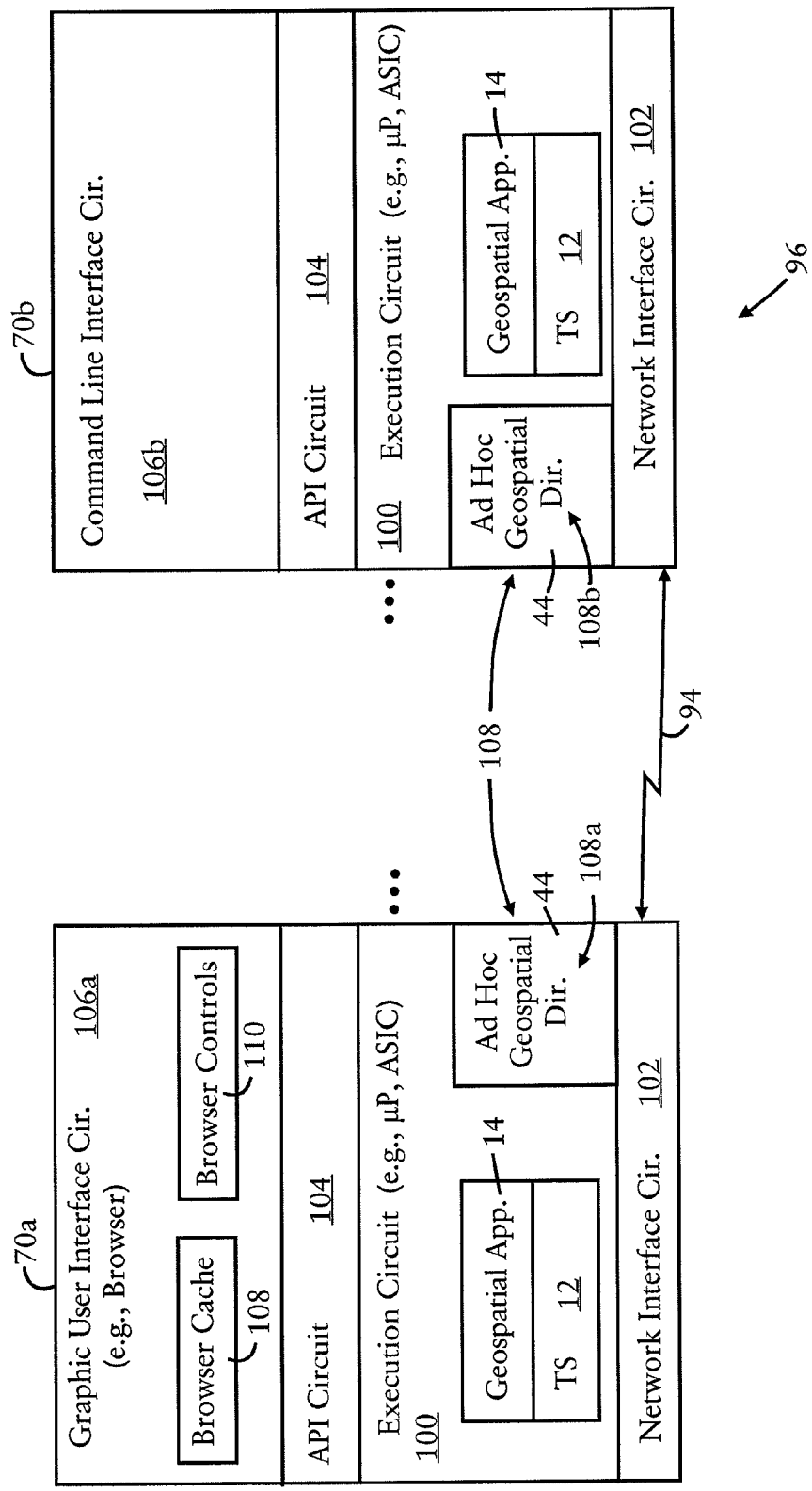
FIG. 9 illustrates another example of computing nodes executing a geospatial application, according to an example embodiment.

FIG. 9 illustrates example computing devices 70 (e.g., 70a, 70b) of FIG. 3 including hardware for execution of the geospatial application 14 and the transformation system 12 of FIG. 1, according to an example embodiment. Each computing node 70 is implemented as a physical machine (i.e., a hardware device). Each of the computing devices 70 can include a non-transitory tangible computer readable storage medium 44, an execution circuit 100, an interface circuit such as a network interface circuit 102 and/or an application programming interface (API) circuit 104, and a user interface circuit 106 such as a graphic user interface (GUI) circuit 106a and/or a command line interface (CLI) circuit 106b. The network interface circuit 102 can be configured for establishing a wired or wireless communication link (e.g., IEEE 802.3, IEEE 802.11, Bluetooth, Universal Serial Bus, etc.) 94 with another network interface circuit 102, for example via a physical communication network (e.g., an Internet Protocol over wired or wireless Ethernet network).

The graphic user interface circuit 106a can include a browser cache 108 (implemented as part of or distinct from the storage medium 44) configured for caching of previously loaded images, user information (e.g., cookies), etc. The graphic user interface circuit 106a also can include browser controls 110, for example non-transitory executable logic configured for translating controls and commands (received via the API circuit 104 from the execution circuit 100) into context-sensitive graphical commands that are available to a user via a browser interface (e.g., a pointing device such as a mouse, touch sensitive screen, etc.). The command line interface circuit 106b can be configured for submitting commands and/or data input by a user via a keyboard (not shown), and displaying results received from the execution circuit 100 via the API circuit 104.

Any of the disclosed circuits of the computing nodes 70, including the execution circuit 100, the network interface circuit 102, the API circuit 104, the user interface circuit 106a or 106b, or the compiler circuit 38 within the transformation system 12, can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (µP) and implemented using one or more integrated circuits, where execution of executable code stored in a memory circuit of a computing node 70 causes the integrated circuit(s) implementing the processor circuit in the computing node 70 to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using one or more integrated circuits implemented in the form of a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit can be implemented dynamically by the processor circuit in the computing node 70, for example based on memory address assignment and partitioning executed by the internal processor circuit.

Further, the steps described herein (e.g., with respect any of the FIGS. 1-16) can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the steps described herein also can be implemented as non-transitory executable logic that is encoded in one or more non-transitory tangible media for execution (e.g., programmable logic arrays or devices, field programmable gate arrays, programmable array logic, application specific integrated circuits, etc.).

V. Optimization of Geospatial Application for Ad Hoc Geospatial Directory

Figure 10:
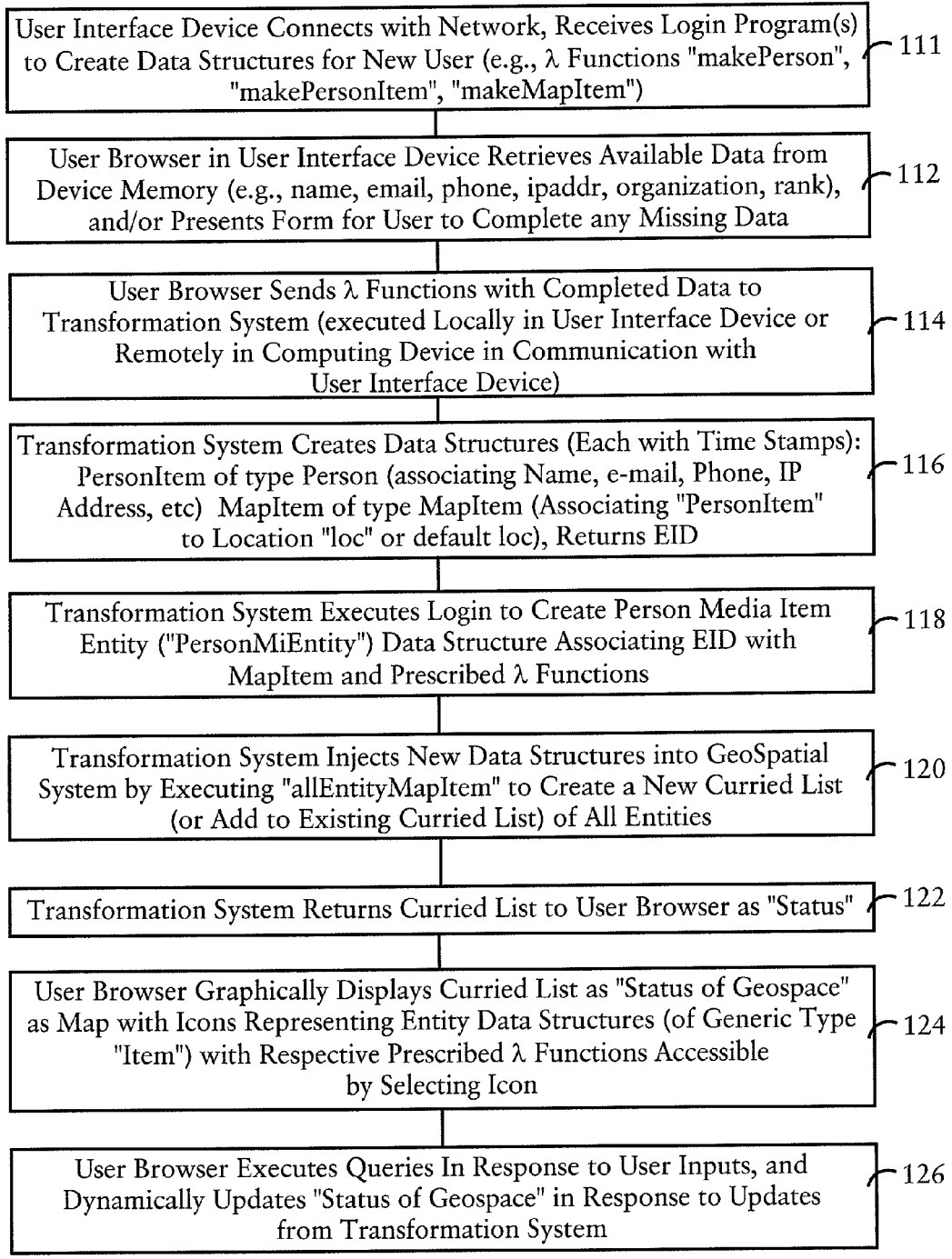
FIG. 10 illustrates an example method by ad hoc devices in generating and operating on an ad hoc geospatial directory of a geospatial application, according to an example embodiment.

FIG. 10 illustrates an example method by computing devices 70 (e.g., 70a, 70b of FIG. 9) executing lambda functions in generating and operating one or more entities of an ad hoc geospatial directory 108 of a geospatial application 14, according to an example embodiment. Each computing device (e.g., laptop, cellphone, smart phone, personal digital assistant, etc.) 70 that executes at least a user interface component (presentation layer) 106 of the geospatial application also has the potential to execute another component of the geospatial application underlying the user interface component, namely execution of operations associated with the geospatial application 14.

The geospatial application 14 and the transformation system 12 of FIG. 1 can be implemented based on execution in hardware by the execution circuit 100 of any one or more of the computing devices 70. In particular, the geospatial application 14 and transformation system 12 can be initially executed solely by the execution circuit 100 of a first computing device (e.g., 70b) that establishes the initial ad hoc geospatial directory 108b based on executing the login of the first user, namely the user of the first computing device 70b.

Assume in step 111 of FIG. 10 that the network interface circuit 102 of a second computing device (e.g., user interface device 70a) establishes a wired or wireless communications link 94 with the network interface circuit 102 of the first computing device: in response to detecting the communications link 94, the execution circuit 100 in the computing device 70b executing the geospatial application can transmit at least a portion of the geospatial application 14 (e.g., login) and at least a portion of the transformation system 12 to the second computing device (e.g., 70a). The execution circuit 100 of the computing device 70b can be configured for selectively providing a substantial portion of the geospatial application 14 and the transformation system 12 based on the determined capabilities of the recently detected computing device 70. For example, if the execution circuit 100 of the computing device 70b determines the recently detected computing device 70 is a tiny client incapable of performing distributed computing of the geospatial application 14 (e.g., a user device having limited processing capabilities and limited web browsing capabilities), the execution circuit 100 can limit transmission to basic user interface lambda functions such as the login lambda function 92h of FIG. 8B; if, however, the execution circuit 100 of the computing device 70b determines the recently detected computing device is a client device 70a capable of performing distributed computing of the geospatial application 14, the execution circuit 100 of the computing device 70b can transmit the transformation system 12 (if not already installed) and a substantial portion of the geospatial application 14 (if not already installed) to the computing device 70a for distributed computing thereof. The execution circuit 100 of the second computing device (e.g., 70a) also can incrementally receive additional components of the geospatial application 14 and/or data structures of the ad hoc geospatial directory 108 (e.g., 108b). Hence, the geospatial application 14 (and transformation system 14) can be propagated to each computing device 70 as it joins the network 96 of computing devices 70.

Hence, the geospatial application 14 can be supplied to different computing devices 70 as they join the network 96, enabling ad hoc distributed execution of the geospatial application 14. As described in further detail below, the ad hoc distributed execution of the geospatial application 14 also enables the establishment of the ad hoc geospatial directory 108 based on the coordinated integration of the respective copies (e.g., 108a, 108b) using distributed queries, data fusion, and feature injection, described below.

In response to the computing device 70a receiving in step 111 at least a portion of the geospatial application 14 and transformation system 12 from the first computing device (e.g., 70b) via its network interface circuit 102, the execution circuit 100 of the second computing device (e.g., 70a) can initiate execution of the geospatial application 14. For example, the user interface device 70a can receive the transformation system 12 and selected program fragments to enabling creation of new data structures for a new entity (e.g., a new person item entity), such as the lambda functions "makePerson" 92a, "makeMapItem" 92b, "makePersonItem" 92c, "newLoginLoc" 92d, "createPersonLoc" 92e, etc.

The user browser 106a executed in the computing device 70a can execute one or more of the supplied lambda functions 92 in step 112 based on retrieving the available data (e.g., user name, user e-mail, user phone number, user IP address, name of user's organization (e.g., fire department, police department, medical response team, etc.) and rank) from device memory or the browser cache 108, and/or presenting a graphical form for the user to complete any missing data using the browser controls 110. The user browser 106 also can access the user cache 108 to determine if the user cache 108 stores an entity identifier: if the user interface determines an entity identifier is stored in the user cache, the user interface uses that entity identifier to execute the login.

In response to the user posting the inputs using the browser controls 110 (or automatic posting by the browser automatically completing the requested fields), the user browser circuit 106*a* can send the posted lambda function(s) 92 with the completed data, for example in the form of a request for execution of at least the one lambda function, to the execution circuit 100 in step 114. If the computing device 70 executing the user browser 106 is locally executing the geospatial application 14, the posted lambda functions 92 are received by the execution circuit 100 via the API circuit 104. If the user device executing the user browser 106 is a tiny client that is not executing the geospatial application 14, the corresponding network interface circuit 102 can forward the request for execution of the one or more lambda functions to a computing device 70 executing the geospatial application (e.g., 70*b*), where the execution circuit 100 of the computing device 70*b* receives the request for execution via the network interface circuit 102.

Hence, the execution circuit 100 (executed locally or remotely) receives the user post from the graphic user interface 106*a* as a request for execution of at least one lambda function in an operation of the geospatial application 14, for example creation of the data structures associated with logging in a new person (e.g., type Person 90*a*, type PersonItem 90*h*, type MapItem 90*i*, and PersonMiEntity 90*m* of FIG. 7). The execution circuit 100 executes the relevant lambda functions 92 of the geospatial application 14, for logging in the user as requested, for example optimizing execution of the relevant lambda functions 92 based on creating in step 116 the relevant data structures (e.g., 90*a*, 90*h*, and 90*i*) for a new user, storing the newly created data structures in the local ad hoc geospatial directory 108*a*, and returning a response to the request that specifies an entity identifier (EID) for the new user; the execution circuit 100 executes in step 118 the login lambda function 92*h* using the EID of the new user for creation and storage in the local ad hoc geospatial directory 108*a* of the data structure "PersonMiEntity" 90*m*. As described previously, the data structure "PersonMiEntity" 90*m* is stored in the local ad hoc geospatial directory 108*a* and includes the EID of type "Integer" 90*q*, the data structure MapItem of type "MapItem" 90*i* (containing the "PersonItem" data structure of type "Person" 90*a* and the Location of type "Location" 90*d*), and selected lambda functions 92 for selective modification of the corresponding MapItem data structure 90*i*. As described previously, each data structure inherently has a monotonically increasing creation identifier (e.g., a temporal attribute such as a time stamp): the monotonically increasing creation identifier enables the tracking the tracking of any attribute of any entity over time (e.g., all use of a given IP address over time, all use of a given phone number at a given time, all entities having been near a given location ("Loc") over time, tracking the location of any entity (person, video camera, RFID tag) over time, etc.).

The execution circuit 100 executing the transformation system 12 can optimize execution of the ad hoc geospatial directory based on injecting the new data structures associated with a new user into the geospatial system by executing a query (e.g., "allEntityMapItem") to create a new curried list representing a concatenated list of all the entities in the ad hoc geospatial directory 108, or add to an existing curried list, of all entities identified collectively within the ad hoc geospatial directory 108. For example, the transformation system 12 executed in the computing device 70*a* can execute the lambda function "allEntityMapItem" on the local ad hoc geospatial directory 108*a*, and/or can forward to the transformation system 12 executed in the computing device 70*b* the lambda function "allEntityMapItem" as a request to create a new curried list of all entities; in response to the computing device 70*a* receiving a response to the request in the form of the curried list from the transformation system 12 executed in the computing device 70*b*, the transformation system 12 executed in the computing device 70*a* can update the curried list with the new user entity in step 120 (and any other locally stored entities in the local ad hoc geospatial directory 108), store the updated curried list in the local directory 108*a*, and return in step 122 the updated curried list to the user browser 106*a* as a "Status" of the ad hoc geospatial directory 108 within the geospatial application 14. The updated curried list is sent in the form of a data structure including the curried list of all the entities in the geospatial directory, the data structure including (e.g., as part of the curried list or distinct from the curried list) one or more lambda functions for generating a query, modifying a state of one of the entities, or accessing one of the entities (e.g., initiating a communication session).

Figure 11:
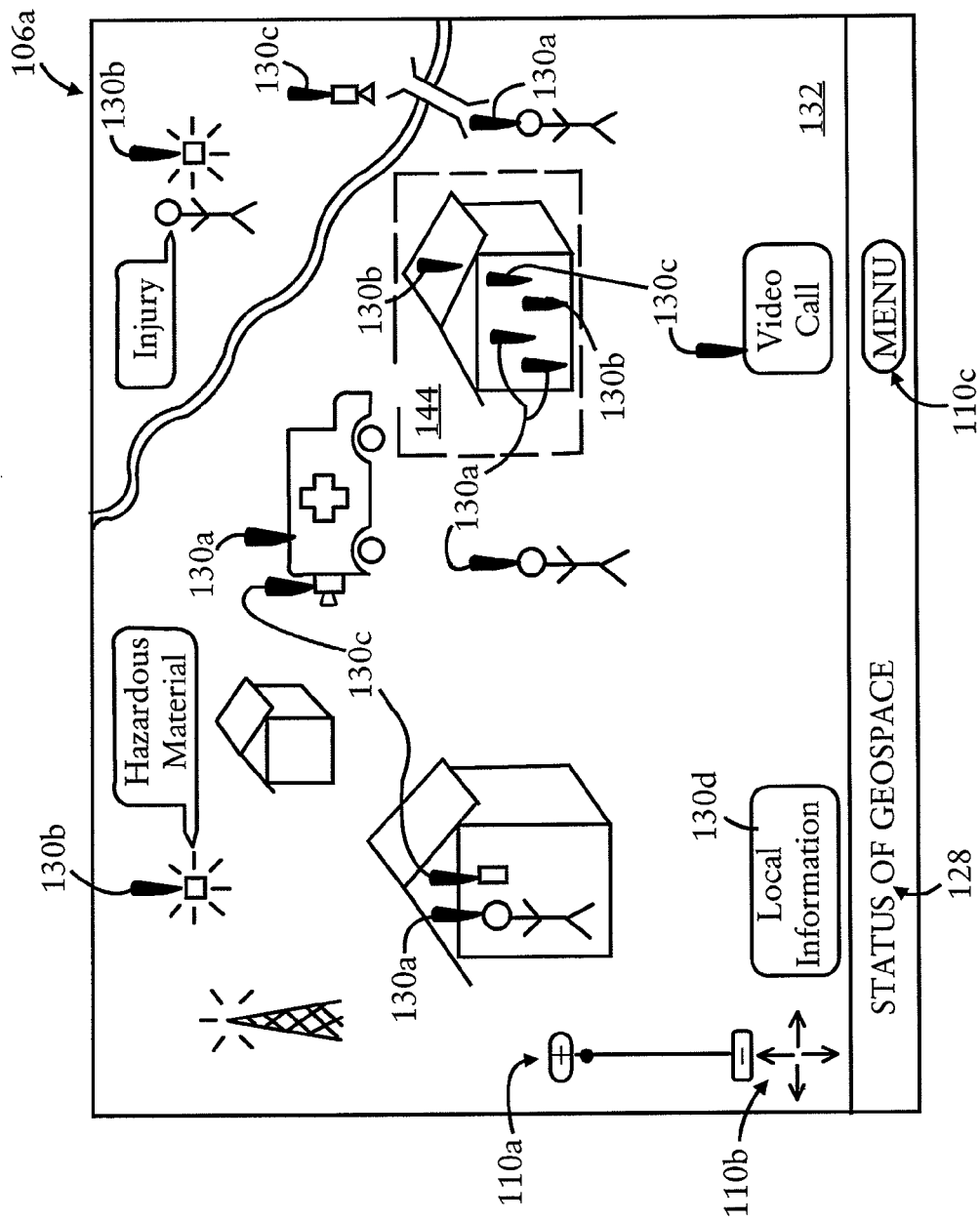
FIG. 11 illustrates an example graphical display of entities of an ad hoc geospatial directory in a geospatial map, according to an example embodiment.

As illustrated in FIG. 11, the user browser 106*a* executed in the computing device 70*a* can graphically display in step 124 the curried list of all the entities in the geospatial directory as a "Status of Geospace" 128, where the entities in the curried list are displayed as icons 130 in a geospatial map 132, for example as a person entity icon 130*a* (associated with a PersonItem), an RFID tag icon 130*b* (associated with an RfidItem), a video tag icon 130*c* (associated with a VideoItem for a video camera), a media tag icon 130*d* (associated with a MediaItem), etc. Hence, a data structure (map item entity) can be displayed in the browser 106*a*, including all the lambda functions, where the data structure received by the user interface includes executable code (in the form of lambda functions) that can be executed by the user interface in the browser 106*a*, each of the elements of the map item entity (including the lambda functions) being strongly typed. Hence, the browser can recognize the different types, for example one data structure is of type "person item", and another data structure is of type "location", hence the "location" data structure can be rendered by the browser as a location on the map, and the "person item" data structure can be rendered as an icon at the corresponding location on the map, where the lambda functions of a data structure are accessible based on selecting the map icon associated with the data structure.

As described previously, each icon 130 is associated with a corresponding entity represented by a corresponding data structure having one or more lambda functions 92 that enable the user, via the geospatial map 132, to generate a query of the ad hoc geospatial directory 108 (for example, based on using the position controls 110*b* or zoom 110*a* to require additional population of entities based on moving or resizing the map 132), modify a state of at least one of the entities (e.g., moved to a different location, offset, rename, set height (i.e., "set Z"), change e-mail address, change phone number, change IP address, etc.), or access one of the entities (e.g., initiating an IP phone call, a video call, a messaging session, etc.).

Hence, a user can view the geospatial application in a browser in the form of a map 132, where each of the lambda functions available to the user can be defined as buttons, menu items, drop-down lists, etc., and the data associated with a command (e.g., "makeRfid") can be displayed in a form on the screen, where the actual textual command with input parameters can be supplied by the browser to the execution engine residing in the computing node 70. If a user selects (e.g., "clicks on") an icon 130 representing a map item entity, the selecting of an icon 130 can invoke a pop-up list for available actions to be performed on that particular map item entity, where the action to be performed is executing a particular lambda function that is available to the user: inside that map item entity will be a list of available lambda functions (e.g., changing a name, changing a z-axis value, changing an e-mail, changing a phone, changing the IP address), which can be presented as menu items for selection by the user. If the user selects one of the lambda functions, a general purpose visualizer for the selected lambda function can open a display window enabling the user to enter the necessary input parameters (e.g., new X location, new Y location, new e-mail address, new phone number, new IP address, etc.). In addition, the general purpose visualizer can open with the appropriate window according to the type to be input, for example one input window for input of an object of type string, another input window for input of an object of type integer, etc.

In response to the user executing another command via the browser controls 110, the user browser sends in step 126 the queries in response to the user inputs, and dynamically updates the "Status of Geospace" in response to the updates executed by the transformation system 12 in step 126. As described previously, no data structure is ever deleted. Further, each entity data structure includes a monotonically increasing creation identifier identifying a creation time relative to other entities (e.g., a time stamp). Hence, the state of a map item entity is updated based on the transformation system 12 obtaining the entity identifier (EID) associated with entity to be modified from associated data structure (e.g., 90*k*, 90*m*, 90*n*, 90*p*): typically the user browser 106 can supply the data structure (e.g., 90*k*, 90*m*, 90*n*, 90*p*), the identification of the lambda function 92 to be invoked, and the relevant input parameters. The transformation system 12 in response can create a new entity data structure having the entity identifier, a unique time stamp, and at least one non-temporal attribute distinct from the original data structure (e.g., the new input parameter) and distinct from the monotonically increasing creation identifier. Hence, the original entity data structure and the new entity data structure represent a corresponding state change in associated entity.

Figure 12:
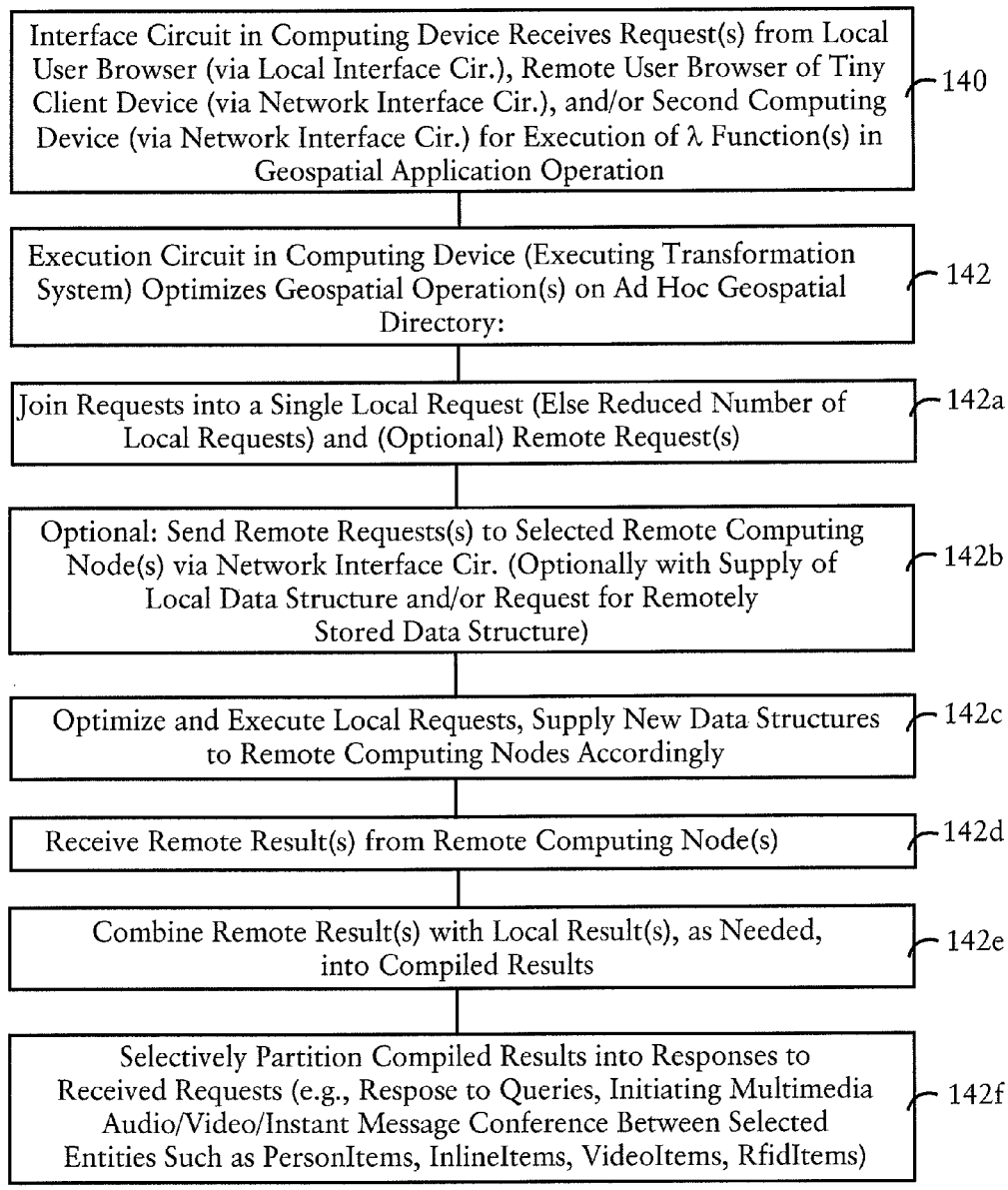
FIG. 12 illustrates example optimizations of a geospatial application by one of the computing nodes of FIG. 3 or FIG. 9, according to an example embodiment.

FIG. 12 illustrates example optimizations of a geospatial application by one of the computing nodes of FIG. 3 or FIG. 9, according to an example embodiment. As apparent from the foregoing, local execution of the SML-based geospatial application 14 by the execution circuit 100 of a computing device 70 enables the execution circuit 100 to execute only those functions that are necessary for completion, i.e., a necessary functions can be deferred until required. Moreover, since the geospatial application is based on the SML language that is non-Turing complete, the execution circuit 100 either will execute a lambda function to completion, or return a "void" (null) result. Hence, a computing device 70 can continue to provide geospatial application operations for the ad hoc geospatial directory 44, even if the computing device 70 becomes disconnected from the remainder of the network 96, since any inaccessible data structures will simply return a "void" (null) result.

Further, the transformation system 12 executed in each computing device is configured for optimizing execution of each lambda function prior to execution thereof based on recompiling the geospatial application 14 as described previously in Section I. Hence, the interface circuit in step 140 receives one or more requests for execution of at least one lambda function 92 in an operation of the geospatial application 14 for operating on one or more entities of the ad hoc geospatial directory 108 as accessible by the computing device 70. For example, the API circuit 104 can receive local requests from the local user interface 106, and the network interface circuit 102 can receive remote requests from a user browser of a tiny client device and/or a second computing device executing a query.

The execution circuit 100 executing the transformation system 12 optimizes in step 142 the operations to be executed on the ad hoc geospatial directory 108. For example, the transformation system 12 can optimize the execution of the requests received in step 140 based on joining in step 142*a* the multiple requests (for execution of respective operations) into a single local request (or a reduced number of local requests), and optionally one or more remote requests. For example, the transformation system 12 may receive multiple queries related to entities within overlapping regions of the geospace: the transformation system 12 can join the multiple queries in step 142*a* into a single locally-executable request related to an area that is the union of all the overlapping areas; the transformation system 12 also can generate from the multiple queries a remote request, distinct from the locally executable request, for remote execution of a portion of the requests related to remote entities that are not within the local ad hoc geospatial directory 108*a*.

The transformation system 12 can send in step 142*b* the remotely executable request to a second computing device (e.g., 70*b*) for execution of the remotely executable request: the remotely-executable request can optionally include a request for a remotely-stored data structure associated with one of the entities of the ad hoc geospatial directory 108, or the request also can supply a locally-stored data structure from the ad hoc geospatial directory 108*a*. If the second computing device receiving the request is unable to complete the request, it can either forward the request to another device, or return a void (null) result. The transformation system 12 as executed by the execution circuit 100 can optimize and execute the local requests in step 142*c*, and supply any new data structures to remote computing nodes as needed (e.g., in response to an update query, etc.).

Assuming the transformation system 12 receives remote results from one or more remote computing nodes 70 in step 142*d* (e.g., the remote results responsive to the previously-sent remotely executable request), the transformation system 12 can compile the remote results with the local results, as needed, to generate compiled results in step 142*e*. The transformation system 12 also can selectively partition the compiled results (or the local result and remote result in uncompiled form) to generate the appropriate responses to the received requests, and return the responses to the requesting user interfaces 106.

As described previously, no data structures are ever deleted from the geospatial application, hence activities of any entity or list of entities can be traced over time based on any defined attribute, for example all entities that have been within a prescribed location, all entities having utilized a prescribed IP address, phone number, etc. Further, individual persons can be tracked based on any one of the defined attributes. Hence, queries such as "allNTT" can be generated for selective retrieval of entities associated with any defined attribute.

As noted from the foregoing description of the geospatial application in Table 1, the geospatial application written according to the symbol manipulation language is expressed as a specification describing the operations to be performed; hence, the implementation and execution of the geospatial application by the transformation system 12 is transparent to the actual specification of the geospatial application 14 according to the prescribed symbol manipulation language as illustrated in Table 1.

Operations such as filtering and finding items within a bounded area 144 of FIG. 11 (e.g., using the "regionFilter" lambda function) can be executed based on the transformation system 12 building a list of all entities (e.g., map item entities using the "allEntityMapItem" lambda function): the list of all entities can be generated by one or more computing devices 70 within the distributed system 96, and sent to any device requiring the list; similarly, a computing device 70 receiving the list can update the list and return the updated list back into the distributed system (e.g., by broadcasting to other computing devices or based on a prescribed data replication and distribution protocol), resulting in continuous updating of the list of all entities by different computing devices within the distributed system.

A computing device 70 executing at least a portion of the geospatial application 14 also can extract, from an existing list of entities stored in the ad hoc geospatial directory 108*a*, a second list of entities that are within a bounded area specified according to a prescribed filtering function (e.g., "getWithFilter", "regionFilter", etc.).

The testing section in Table 1 illustrates examples of calling the previously-described user interface lambda functions in Table 1. Hence, the testing portion illustrates example commands that could be entered into a command line interface (CLI) 106*b* or a GUI 106*a*.

More advanced operations illustrated in step 142*f* include selecting multiple map item entities on the map 132 in order to simultaneously operate on all selected entities; example operations include simultaneously moving all the selected entities, or simultaneously setting up shared communication session such as a shared multimedia, audio, video, instant messaging, and/or conference telephone communication session between all the selected entities based on invoking one or more accessor lambda functions for accessing the entities via respective access protocols.

Further, the use of strongly-typed definitions enables new features to be added dynamically to the geospatial application 14 while maintaining stability. For example, if a new type was to be added to the type "Person" 90*a* (e.g., pager number), the new type can be added, and the transformation system can recompile the geospatial application 14, enabling the added property (e.g., pager number) to be automatically added to the user interface as a new type, without the necessity of manually modifying the code in the geospatial application.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving from a user interface, by a computing device, a request for execution of at least one lambda function in an operation of a geospatial application, the geospatial application having lambda functions for operating on one or more entities of an ad hoc geospatial directory accessible by the computing device, the lambda functions having strongly typed definitions according to a prescribed symbol manipulation language that is a non-Turing complete language, that does not permit partial functions, and that is independent of any attribute of any computing system;
optimizing execution by the computing device of the operation on the ad hoc geospatial directory; and
the computing device returning to the user interface a response to the request based on the optimizing execution of the operation, the response including a data structure including at least one of the lambda functions for a corresponding at least one of generating a query of the ad hoc geospatial directory, modifying a state of at least a first of the entities, or accessing the first of the entities, wherein the optimizing includes:
receiving a plurality of requests for execution of respective operations of the geospatial application,
joining the requests into at least one locally-executable request and at least one remotely-executable request,
sending the remotely-executable request to a second computing device;
receiving from the second computing device a remote result responsive to the remotely-executable request,
executing the locally-executable request for generation of a local result, and
generating the responses for the respective requests based on selective partitioning of the local result and the remote result.

2. The method of claim 1, wherein the remotely-executable request includes at least one of a request for a remotely-stored data structure associated with a second of the entities in the ad hoc geospatial directory, or a supply of a locally-stored data structure associated with the first of the entities in the ad hoc geospatial directory.

3. The method of claim 1, wherein no data structure is ever deleted from the ad hoc geospatial directory and every data structure includes a monotonically increasing creation identifier, the modifying the state of the first of the entities including:
obtaining an entity identifier associated with the first of the entities from a first entity data structure associated with the first of the entities; and
creating a new entity data structure having the entity identifier, and at least one non-temporal attribute distinct from the first entity data structure and distinct from the monotonically increasing creation identifier, the first entity data structure and the new entity data structure representing a corresponding state change in the first of the entities, each entity data structure including a temporal identifier identifying a creation time.

4. The method of claim 1, wherein the data structure in the response identifies at least one entity and includes accessor lambda functions for accessing the at least one entity via respective access protocols.

5. The method of claim 4, wherein the data structure identifies a plurality of the entities responsive to a query in the request, the method further comprising:
receiving a second request from the user interface for executing one of the accessor lambda functions associated with the entities responsive to the query; and
optimizing the second request based on initiating a shared communication session between the entities responsive to the query and the user interface, according to a prescribed device access protocol associated with the one accessor lambda function.

6. The method of claim 1, wherein the optimizing includes:
creating the data structure according to a prescribed type based on at least one of the lambda functions, the prescribed type established according to a prescribed typing discipline; and
injecting the data structure into the ad hoc geospatial directory, based on at least one of creating a second data structure associating the data structure with the one entity, or executing one of the lambda functions for concatenating the data structure with the entities of the ad hoc geospatial directory.

7. The method of claim 6, wherein:
the request is associated with a login operation for a user of the user interface into the ad hoc geospatial directory, the request including at least one of a plurality of strongly typed data attributes associated with the user, or an entity identifier associated with the user and the associated strongly typed data attributes;

the data structure in the response including a curried list of all the entities in the geospatial directory that enables the user interface to display the entities as icons in a geospatial map, the curried list including lambda functions for generating the query for at least the first of the entities, modifying the state of at least the first of the entities, or accessing at least the first of the entities according to a selected communications protocol.

8. The method of claim 1, wherein the optimizing includes:

receiving a plurality of requests for execution of respective operations of the geospatial application;

joining the requests into a single locally-executable request, and executing the locally-executable request to obtain a local result; and generating the response for the respective requests based on selective partitioning of the local result.

9. An apparatus comprising:

an interface circuit configured for receiving, from a user interface, a request for execution of at least one lambda function in an operation of a geospatial application, the geospatial application having lambda functions for operating on one or more entities of an ad hoc geospatial directory accessible by the computing device, the lambda functions having strongly typed definitions according to a prescribed symbol manipulation language that is a non-Turing complete language, that does not permit partial functions, and that is independent of any attribute of any computing system; and an execution circuit configured for optimizing execution by the apparatus of the operation on the ad hoc geospatial directory, the execution circuit configured for returning to the user interface, via the interface circuit a response to the request based on the optimizing execution of the operation, the response including a data structure including at least one of the lambda functions for a corresponding at least one of generating a query of the ad hoc geospatial directory, modifying a state of at least a first of the entities, or accessing the first of the entities;

wherein the interface circuit is configured for receiving a plurality of requests for execution of respective operations of the geospatial application, the execution circuit configured for optimizing execution of the requests based on:

joining the requests into at least one locally-executable request and at least one remotely-executable request, sending the remotely-executable request to a second computing device, receiving from the second computing device a remote result responsive to the remotely-executable request, executing the locally-executable request for generation of a local result, and generating the responses for the respective requests based on selective partitioning of the local result and the remote result.

10. The apparatus of claim 9, wherein the remotely-executable request includes at least one of a request for a remotely-stored data structure associated with a second of the entities in the ad hoc geospatial directory, or a supply of a locally-stored data structure associated with the first of the entities in the ad hoc geospatial directory.

11. The apparatus of claim 9, wherein no data structure is ever deleted from the ad hoc geospatial directory and every data structure includes a monotonically increasing creation identifier, the execution circuit configured for modifying the state of the first of the entities based on:

obtaining an entity identifier associated with the first of the entities from a first entity data structure associated with the first of the entities; and creating a new entity data structure having the entity identifier, and at least one non-temporal attribute distinct from the first entity data structure and distinct from the monotonically increasing creation identifier, the first entity data structure and the new entity data structure representing a corresponding state change in the first of the entities, each entity data structure including a temporal identifier identifying a creation time.

12. The apparatus of claim 9, wherein the data structure in the response identifies at least one entity and includes accessor lambda functions for accessing the at least one entity via respective access protocols.

13. The apparatus of claim 12, wherein:

the data structure identifies a plurality of the entities responsive to a query in the request;

the interface circuit configured for receiving a second request from the user interface for executing one of the accessor lambda functions associated with the entities responsive to the query;

the execution circuit configured for optimizing the second request based on initiating a shared communication session between the entities responsive to the query and the user interface, according to a prescribed device access protocol associated with the one accessor lambda function.

14. The apparatus of claim 9, wherein the execution circuit is configured for optimizing execution of the operation based on:

creating the data structure according to a prescribed type based on at least one of the lambda functions, the prescribed type established according to a prescribed typing discipline; and injecting the data structure into the ad hoc geospatial directory, based on at least one of creating a second data structure associating the data structure with the one entity, or executing one of the lambda functions for concatenating the data structure with the entities of the ad hoc geospatial directory.

15. The apparatus of claim 14, wherein:

the request is associated with a login operation for a user of the user interface into the ad hoc geospatial directory, the request including at least one of a plurality of strongly typed data attributes associated with the user, or an entity identifier associated with the user and the associated strongly typed data attributes;

the data structure in the response including a curried list of all the entities in the geospatial directory that enables the user interface to display the entities as icons in a geospatial map, the curried list including lambda functions for generating the query for at least the first of the entities, modifying the state of at least the first of the entities, or accessing at least the first of the entities according to a selected communications protocol.

16. The apparatus of claim 9, wherein:

the interface circuit is configured for receiving a plurality of requests for execution of respective operations of the geospatial application;

the execution circuit configured for optimizing execution of the requests based on joining the requests into a single locally-executable request, and executing the locally-executable request to obtain a local result, generating the response for the respective requests based on selective partitioning of the local result.

17. Non-transitory logic encoded in one or more non-transitory tangible media for execution by a computing device and when executed operable for:

receiving from a user interface, by a computing device, a request for execution of at least one lambda function in an operation of a geospatial application, the geospatial application having lambda functions for operating on one or more entities of an ad hoc geospatial directory accessible by the computing device, the lambda functions having strongly typed definitions according to a prescribed symbol manipulation language that is a non-Turing complete language, that does not permit partial functions, and that is independent of any attribute of any computing system;

optimizing execution by the computing device of the operation on the ad hoc geospatial directory; and the computing device returning to the user interface a response to the request based on the optimizing execution of the operation, the response including a data structure including at least one of the lambda functions for a corresponding at least one of generating a query of the ad hoc geospatial directory, modifying a state of at least a first of the entities, or accessing the first of the entities, wherein the optimizing includes:

receiving a plurality of requests for execution of respective operations of the geospatial application, joining the requests into at least one locally-executable request and at least one remotely-executable request, sending the remotely-executable request to a second computing device;

receiving from the second computing device a remote result responsive to the remotely-executable request, executing the locally-executable request for generation of a local result, and generating the responses for the respective requests based on selective partitioning of the local result and the remote result.

* * * * *